United States Patent
Jiang et al.

(10) Patent No.: US 11,834,038 B2
(45) Date of Patent: Dec. 5, 2023

(54) METHODS AND SYSTEMS FOR PROVIDING DEPTH MAPS WITH CONFIDENCE ESTIMATES

(71) Applicant: NODAR Inc., Somerville, MA (US)

(72) Inventors: Leaf Alden Jiang, Concord, MA (US); Carsten Louis Boers, Cambridge, MA (US)

(73) Assignee: NODAR Inc., Somerville, MA (US)

( * ) Notice: Subject to any disclaimer, the term of this patent is extended or adjusted under 35 U.S.C. 154(b) by 0 days.

(21) Appl. No.: 17/887,588

(22) Filed: Aug. 15, 2022

(65) Prior Publication Data

US 2023/0076036 A1    Mar. 9, 2023

Related U.S. Application Data

(63) Continuation of application No. 17/559,384, filed on Dec. 22, 2021, now Pat. No. 11,427,193, which is a
(Continued)

(51) Int. Cl.
    *B60W 30/09*      (2012.01)
    *G01S 17/89*      (2020.01)
    *G06T 7/50*      (2017.01)

(52) U.S. Cl.
    CPC ............ *B60W 30/09* (2013.01); *G01S 17/89* (2013.01); *G06T 7/50* (2017.01); *G06T 2207/10024* (2013.01); *G06T 2207/10028* (2013.01)

(58) Field of Classification Search
    CPC . G06T 7/50; G06T 2207/10024; G01S 17/89; B60W 30/09
(Continued)

(56) References Cited

U.S. PATENT DOCUMENTS

| | | |
|---|---|---|
| 6,392,688 B1 | 5/2002 | Barman et al. |
| 8,208,716 B2 | 6/2012 | Choi et al. |

(Continued)

FOREIGN PATENT DOCUMENTS

| | | |
|---|---|---|
| DE | 10-2009-0031998 A | 3/2009 |
| DE | 10 2012 009 577 A1 | 11/2012 |

(Continued)

OTHER PUBLICATIONS

International Search Report and Written Opinion for International Application No. PCT/US2021/064856, dated May 5, 2022.
(Continued)

*Primary Examiner* — Yazan A Soofi
(74) *Attorney, Agent, or Firm* — Wolf, Greenfield & Sacks, P.C.

(57) ABSTRACT

An automated vehicle assistance system is provided for supervised or unsupervised vehicle movement. The system includes a control system and a first sensor system. The first sensor system may receive first image data of a scene and may output a first disparity map and a first confidence map based on the first image data. The control system may output a video stream based on the first disparity map and the first confidence map. The vehicle assistance system also may include a second sensor system that receives second image data of at least a portion of the scene that outputs a second confidence map based on second image data. The video stream may include super-frames, with each super-frame including a 2D image of the scene, a depth map corresponding to the 2D image, and a certainty map corresponding to the depth map.

21 Claims, 9 Drawing Sheets
(2 of 9 Drawing Sheet(s) Filed in Color)

Related U.S. Application Data continuation-in-part of application No. PCT/US2021/012294, filed on Jan. 6, 2021.

(60) Provisional application No. 63/229,102, filed on Aug. 4, 2021, provisional application No. 62/964,148, filed on Jan. 22, 2020.

(58) Field of Classification Search
USPC .......................................................... 701/23
See application file for complete search history.

(56) References Cited

U.S. PATENT DOCUMENTS

| | | | |
|---|---|---|---|
| 8,797,387 | B2 | 8/2014 | Huggett et al. |
| 8,971,634 | B2 | 3/2015 | Barnum |
| 8,981,966 | B2 | 3/2015 | Stein et al. |
| 9,286,680 | B1 | 3/2016 | Jiang et al. |
| 9,369,689 | B1 | 6/2016 | Tran et al. |
| 9,509,979 | B2 | 11/2016 | Livyatan et al. |
| 9,958,964 | B2 * | 5/2018 | Wurster ................ G06F 3/02 |
| 10,097,812 | B2 | 10/2018 | Livyatan et al. |
| 10,244,228 | B2 | 3/2019 | Millett |
| 10,257,489 | B2 | 4/2019 | Nam |
| 10,430,959 | B2 | 10/2019 | Chang et al. |
| 10,567,748 | B2 | 2/2020 | Okouneva |
| 10,591,594 | B2 | 3/2020 | Oyaizu et al. |
| 10,965,929 | B1 * | 3/2021 | Bellows ............... H04N 13/122 |
| 11,157,751 | B2 | 10/2021 | Kumano et al. |
| 11,282,234 | B2 | 3/2022 | Jiang et al. |
| 11,321,875 | B2 | 5/2022 | Jiang et al. |
| 11,321,876 | B2 | 5/2022 | Jiang et al. |
| 11,427,193 | B2 | 8/2022 | Jiang et al. |
| 11,577,748 | B1 | 2/2023 | Wang et al. |
| 2007/0291125 | A1 | 12/2007 | Marquet |
| 2010/0208034 | A1 | 8/2010 | Chen |
| 2011/0025548 | A1 | 2/2011 | Nickolaou |
| 2011/0050864 | A1 | 3/2011 | Bond |
| 2012/0321172 | A1 | 12/2012 | Jachalsky et al. |
| 2013/0063594 | A1 | 3/2013 | Hwang et al. |
| 2013/0188018 | A1 | 7/2013 | Stevens et al. |
| 2013/0329015 | A1 * | 12/2013 | Pulli ..................... G06T 7/593 348/47 |
| 2015/0103147 | A1 | 4/2015 | Ho et al. |
| 2016/0323560 | A1 | 11/2016 | Jin et al. |
| 2016/0323561 | A1 | 11/2016 | Jin et al. |
| 2017/0278014 | A1 | 9/2017 | Lessmann et al. |
| 2017/0287169 | A1 * | 10/2017 | Garcia .................. G06T 7/85 |
| 2017/0307759 | A1 | 10/2017 | Pei et al. |
| 2017/0358092 | A1 | 12/2017 | Bliebel et al. |
| 2018/0007345 | A1 | 1/2018 | Bougnoux |
| 2018/0222499 | A1 | 8/2018 | Gomes et al. |
| 2019/0087186 | A1 * | 3/2019 | Endo .................... G05B 23/024 |
| 2019/0158813 | A1 | 5/2019 | Rowell et al. |
| 2019/0204427 | A1 | 7/2019 | Abari et al. |
| 2019/0208181 | A1 * | 7/2019 | Rowell ................. H04N 9/8715 |
| 2019/0220989 | A1 | 7/2019 | Harmsen et al. |
| 2019/0289282 | A1 | 9/2019 | Briggs et al. |
| 2019/0295282 | A1 | 9/2019 | Smolyanskiy et al. |
| 2019/0304164 | A1 | 10/2019 | Zhang |
| 2020/0064483 | A1 * | 2/2020 | Li ........................ G01S 7/4026 |
| 2020/0077073 | A1 | 3/2020 | Nash et al. |
| 2020/0177870 | A1 | 6/2020 | Tadi et al. |
| 2020/0346581 | A1 | 11/2020 | Lawson et al. |
| 2020/0409376 | A1 | 12/2020 | Ebrahimi Afrouzi et al. |
| 2021/0003683 | A1 | 1/2021 | Chen et al. |
| 2021/0327092 | A1 * | 10/2021 | Jiang .................... G06T 7/85 |
| 2021/0350576 | A1 | 11/2021 | Jiang et al. |
| 2021/0352259 | A1 | 11/2021 | Jiang et al. |
| 2022/0111839 | A1 * | 4/2022 | Jiang .................... G06T 7/593 |
| 2023/0005184 | A1 | 1/2023 | Jiang et al. |
| 2023/0076036 | A1 | 3/2023 | Jiang et al. |

FOREIGN PATENT DOCUMENTS

| | | |
|---|---|---|
| EP | 1 457 384 A1 | 9/2004 |
| JP | 2003-269917 A | 9/2003 |
| JP | 2008-022125 A | 1/2008 |
| JP | 2008-509619 A | 3/2008 |
| JP | 2015-136056 A | 7/2015 |
| JP | 2015-1558749 A | 9/2015 |
| JP | 2016-048839 A | 4/2016 |
| WO | WO 2007/057058 A1 | 4/2017 |
| WO | WO 2017/209015 A1 | 12/2017 |
| WO | WO 2018/196001 A1 | 11/2018 |

OTHER PUBLICATIONS

Achanta et al., SLIC superpixels compared to state-of-the-art superpixel methods. IEEE Transactions on Pattern Analysis and Machine Intelligence. May 29, 2012;34(11):2274-82.

Badino et al., Free space computation using stochastic occupancy grids and dynamic programming. Workshop on Dynamical Vision, ICCV, Rio de Janeiro, Brazil. Oct. 20, 2007;20:73.

Cholakkal et al., LiDAR-Stereo Camera Fusion for Accurate Depth Estimation. 2020 AEIT International Conference of Electrical and Electronic Technologies for Automotive (AEIT AUTOMOTIVE). Nov. 18, 2020:1-6.

Dai et al., A Review of 3D Object Detection for Autonomous Driving of Electric Vehicles. World Electric Vehicle Journal. Sep. 2021;12(3):139.

Fan et al., Real-time stereo vision-based lane detection system. Measurement Science and Technology. May 24, 2018;29(7):074005.

Feng et al., Deep multi-modal object detection and semantic segmentation for autonomous driving: Datasets, methods, and challenges. IEEE Transactions on Intelligent Transportation Systems. Feb. 17, 2020;22(3):1341-60.

Guindel et al., Automatic extrinsic calibration for lidar-stereo vehicle sensor setups. 2017 IEEE 20th International Conference on Intelligent Transportation Systems (ITSC). Oct. 16, 2017:1-6.

Hamid et al., Stereo matching algorithm based on deep learning: A survey. Journal of King Saud University: Computer and Information Sciences. Aug. 28, 2020:1-11.

Hinzmann et al., Flexible stereo: Constrained, non-rigid, wide-baseline stereo vision for fixed-wing aerial platforms. 2018 IEEE International Conference on Robotics and Automation (ICRA) May 21, 2018:2550-7.

Hirschmüller et al., Evaluation of cost functions for stereo matching. 2007 IEEE Conference on Computer Vision and Pattern Recognition. Jun. 17, 2007:1-8.

Hirschmüller, Stereo processing by semiglobal matching and mutual information. IEEE Transactions on Pattern Analysis and Machine Intelligence. Dec. 18, 2007;30(2):328-41.

Hsu et al., Online Recalibration of a Camera and Lidar System. 2018 IEEE International Conference on Systems, Man, and Cybernetics (SMC). Oct. 7, 2018:4053-8.

Hu et al., A quantitative evaluation of confidence measures for stereo vision. IEEE Transactions on Pattern Analysis and Machine Intelligence. Jan. 31, 2012;34(11):2121-33.

John et al., Automatic calibration and registration of lidar and stereo camera without calibration objects. 2015 IEEE International Conference on Vehicular Electronics and Safety (ICVES). Nov. 5, 2015:231-7.

Kakegawa et al., Road surface segmentation based on vertically local disparity histogram for stereo camera. International Journal of Intelligent Transportation Systems Research. May 2018; 16(2):90-7.

Longuet-Higgins, A computer algorithm for reconstructing a scene from two projections. Nature. Sep. 1981;293(5828):133-5.

Nelder et al., A simplex method for function minimization. The Computer Journal. Jan. 1, 1965;7(4):308-13.

Poggi et al., On the confidence of stereo matching in a deep-learning era: a quantitative evaluation. IEEE Transactions on Pattern Analysis and Machine Intelligence. Apr. 2, 2021:1-8.

(56) References Cited

OTHER PUBLICATIONS

Rajaraman et al., Fully automatic, unified stereo camera and LiDAR-camera calibration. Automatic Target Recognition XXXI. Apr. 12, 2021;11729:270-277.

Rhemann et al., Fast cost-volume filtering for visual correspondence and beyond. CVPR '11: Proceedings of the 2011 IEEE Conference on Computer Vision and Pattern Recognition. Jun. 2011:3017-24.

Rosero et al., Calibration and multi-sensor fusion for on-road obstacle detection. 2017 Latin American Robotics Symposium (LARS) and 2017 Brazilian Symposium on Robotics (SBR). Nov. 8, 2017:1-6.

Sarika et al., Census filtering based stereomatching under varying radiometric conditions. Procedia Computer Science. Jan. 1, 2015;58:315-20.

Woo et al., Localization for autonomous driving. Handbook of Position Location: Theory, Practice, and Advances, Second Edition. Mar. 23, 2018:1051-87.

Zabih et al., Non-parametric local transforms for computing visual correspondence. European Conference on Computer Vision May 2, 1994:151-158.

Zhang et al., A robust and rapid camera calibration method by one captured image. IEEE Transactions on Instrumentation and Measurement. Dec. 17, 2018;68(10):4112-21.

Ashigahara, How close has computer vision come to human vision? Difficulties and practical approaches to avoid them. Vision Systems for robots and their applications. Journal of the Institute of Image Information and Television Engineers. Dec. 1, 2006;60(12):1914-9.

International Preliminary Report on Patentability for International Application No. PCT/US2021/064856, dated Jul. 20, 2023.

\* cited by examiner

METHODS AND SYSTEMS FOR PROVIDING DEPTH MAPS WITH CONFIDENCE ESTIMATES

CROSS-REFERENCE TO RELATED APPLICATIONS

The present application is a Continuation of U.S. application Ser. No. 17/559,384, filed Dec. 22, 2021, entitled "METHODS AND SYSTEMS FOR PROVIDING DEPTH MAPS WITH CONFIDENCE ESTIMATES," the entire contents of which is incorporated by reference herein.

U.S. application Ser. No. 17/559,384 claims the benefit of priority of U.S. Provisional Application No. 63/229,102 filed Aug. 4, 2021, entitled "Depth Sensing System with Confidence Map," and is a continuation in part of International Application No. PCT/US2021/12294 filed Jan. 6, 2021, entitled "Non-Rigid Stereo Vision Camera System," which claims the benefit of priority of U.S. Provisional Application No. 62/964,148 filed Jan. 22, 2020, entitled "Untethered Stereo Vision Camera System." The entire contents of each of these applications is incorporated by reference herein.

FIELD OF THE INVENTION

The technology of the present invention relates to stereo vision systems. In particular, the present technology relates to a stereo vision system (e.g., a stereo camera system) that captures images of a scene and outputs two-dimensional ("2D") image data, depth-estimate data relating to distances to objects in the scene, and confidence data relating to a level of certainty of the depth-estimate data.

BACKGROUND

Stereo vision systems typically use two cameras (e.g., left and right cameras) to estimate distance by measuring a disparity or parallax between matching pixels in an image captured by the left camera and an image captured by the right camera. For example, U.S. Pat. No. 8,208,716B2 discloses a stereo vision system and method that outputs a disparity map, which is a 2D matrix that contains pixel-shift data corresponding to a rectified image captured by one of the cameras (often the left camera). An estimate of depth for each pixel of the image, corresponding to a distance from the camera to an object imaged in the pixel, may be easily computed from the disparity map because the depth of the pixel is inversely proportional to the disparity of the pixel. As such, the terms "depth map" and "disparity map" may be used interchangeably herein, because they provide nearly identical information about the scene of the image.

A problem with existing stereo vision systems is that depth estimates typically are provided without an indication of how reliable (or unreliable) the estimates are on a pixel-by-pixel basis or even on a frame-by-frame basis. In conventional driver assistance systems, an automated decision to stop or steer a vehicle may be made based on information from multiple sensors (e.g., radar, lidar, cameras, etc.) without knowledge of the reliability of the information from any of the sensors. This may result in the driver assistance systems overcompensating for the uncertainty of conflicting information from the sensors by performing unnecessary procedures (e.g., traveling at excessively low speed, braking overly frequently, etc.), which may decrease passenger comfort, or may result in the driver assistance systems undercompensating for the uncertainty of the conflicting information by arbitrarily picking one sensor over another, which may decrease passenger risk. As will be appreciated, decisions made by driver assistance systems may greatly impact passenger safety and may, at times, be critical, life-dependent decisions. For example, when a vehicle is traveling at a cruising speed typical of highway driving, accurate knowledge of a distance to an object may be critical to how a driver assistance system controls the vehicle to avoid hitting the object while maintaining or nearly maintaining the cruising speed.

SUMMARY

Autonomous vehicles and advanced driver assistance systems may use information from various types of sensors (e.g., lidar, radar, camera, ultrasound, stereo cameras, etc.) to obtain information about a vehicle's surroundings, to enable a vehicle's control system to make decisions about how to steer the vehicle, how to adjust the vehicle's speed (e.g., accelerate or decelerate), whether to deploy safety measures (e.g., turn on warning flashers), etc. As will be appreciated, a vehicle's control system may include dozens of electronic control modules or units ("ECUs") and, in some cases, over one hundred ECUs, with each ECU controlling an aspect of vehicle operation (e.g., a speed control ECU, a brake control ECU, a transmission control ECU, an engine control ECU, a battery management ECU, etc.).

The inventors have recognized and appreciated that, to best fuse or combine data from different types of sensors, it is important to know the level of confidence or certainty of measurements from each of the sensors. In some aspects of the present technology, high-resolution depth information, indicating a distance to a feature appearing in a pair of images, may be determined through stereo matching of the pair of images. The stereo matching may be performed to provide distance certainty information based on any one or any combination of: disparity features, prior images, cost curves, and local properties. The distance certainty information may be used to minimize or eliminate a problem in sensor fusion by enabling a reliability of the depth information to be rated, and therefore may increase the degree of safety of decisions made using the depth information.

According to an aspect of the present technology, an automated vehicle assistance system for supervised or unsupervised vehicle movement is provided. The system may be comprised of: a vehicle control system comprised of a computer processor and a memory coupled to the computer processor; and a first sensor system configured to receive first image data of a scene and to output a first disparity map and a first confidence map based on the first image data. The vehicle control system may be configured to: receive the first disparity map and the first confidence map from the first sensor system, and output a video stream comprised of the first disparity map and the first confidence map.

In some embodiments of this aspect, in the video stream, the first confidence map may be encoded to be part of the first disparity map. In some embodiments, the disparity map may be comprised of disparity data for each of the pixels, and the confidence map may be comprised of confidence data for each of the pixels. In some embodiments, the first image data may be comprised of data for left and right two-dimensional (2D) first images, the first sensor system may be configured to produce left and right (2D) rectified first images and a first cost volume map from the first image data, and the first sensor system may be configured to produce the first confidence map from: the 2D rectified first images, the first disparity map, and the first cost volume map. In some embodiments, the first sensor system may be configured to produce the first confidence map based on one or both of: a uniqueness value determined from a semi-global matching (SGM) algorithm, and an image texture metric determined from a Sobel operation on the first image data.

In some embodiments of this aspect, the vehicle assistance system may further be comprised of a second sensor system configured to receive second image data of at least a portion of the scene and to output a second confidence map based on the second image data. The vehicle control system may be configured to: receive the second confidence map from the second sensor system, and output the video stream as a sequence of super-frames, with each super-frame being comprised of information based on: the first disparity map, the first confidence map, and the second confidence map. In some embodiments, the vehicle control system may be configured to output a control signal to an electronic control unit (ECU) of a vehicle based on the information of the video stream. In some embodiments, the first sensor system may be a first sensor module configured to process the first image data to produce the first disparity map and the first confidence map, the second sensor system may be a second sensor module configured to process the second image data to produce the second confidence map, the first and second sensor modules may be stored in the memory, and the computer processor may be configured to execute the first sensor module and the second sensor module. In some embodiments, the video stream may be comprised of: at least one super-frame comprised of the first disparity map and the first confidence map, and at least one super-frame comprised of the first disparity map and the second confidence map. In some embodiments, the video stream may be comprised of at least one super-frame comprised of a portion of the first confidence map and a portion of the second confidence map. In some embodiments, the first image data may be comprised of stereo-vision data, and the second image data may be comprised of lidar data.

In some embodiments of this aspect, the vehicle assistance system may further be comprised of a third sensor system configured to receive third image data of at least a portion of the scene and to output a third confidence map based on the third image data. The third image data is comprised of radar data or acoustic data.

In some embodiments of this aspect, each super-frame of the video stream may be comprised of: a two-dimensional (2D) image of the scene, a depth map of the scene, and a certainty map of the scene. In some embodiments, the certainty map of the scene may be comprised of the first confidence map or the second confidence map or a combination of the first and second confidence maps. In some embodiments, the depth map of the scene may be comprised of the first disparity map modulated with image data corresponding to the 2D image of the scene, and the certainty map of the scene may be comprised of the comprised of the first confidence map or the second confidence map or a combination of the first and second confidence maps modulated with image data corresponding to the 2D image of the scene. In some embodiments, pixels of the 2D image of the scene, pixels of the depth map of the scene, and pixels of the certainty map of the scene may be temporally and spatially matched. In some embodiments, the vehicle control system may be configured to encode disparity information from the first disparity map and confidence information from the first and second confidence maps to reduce a data size of the video stream.

In some embodiments of this aspect, the vehicle assistance system may further be comprised of a pair of cameras configured to be mounted on a vehicle. The cameras may be configured to provide the first image data to the first sensor system.

In some embodiments of this aspect, the video stream may be comprised of two-dimensional (2D) color images, with each 2D color image being comprised of a plurality of pixels, and with an alpha-channel transparency of each pixel being proportional to a confidence value for the pixel. In some embodiments, colors of the 2D color images may indicate depth ranges.

According to another aspect of the present technology, a non-transitory computer-readable storage medium is provided in which is stored code that, when executed by a computer processor, causes the computer processor to perform a method of an automated vehicle assistance system for supervised or unsupervised vehicle movement. The method may be comprised of: the computer processor obtaining a first disparity map and a first confidence map, with the first disparity map and the first confidence map corresponding to first image data of a scene, and the computer processor outputting a video stream comprised of the first disparity map and the first confidence map.

In some embodiments of this aspect, the outputting of the video stream may be comprised of the computer processor encoding the first confidence map to be part of the first disparity map. In some embodiments, the first image data may be comprised of a plurality of pixels, the disparity map may be comprised of disparity data for each of the pixels, and the confidence map may be comprised of confidence data for each of the pixels. In some embodiments, the method may further be comprised of: the computer processor obtaining a second confidence map corresponding to second image data of at least a portion of the scene, and the computer processor outputting the video stream as a sequence of super-frames, with each super-frame being comprised of information based on: the first disparity map, the first confidence map, and the second confidence map. In some embodiments, the method may further be comprised of the computer processor outputting a control signal to an electronic control unit (ECU) of a vehicle based on the information of the video stream. In some embodiments, the method may further be comprised of: the computer processor processing the first image data to obtain the first disparity map and the first confidence map, and the computer processor processing the second image data to obtain the second confidence map.

In some embodiments of this aspect, the outputting of the video stream may be comprised of: the computer processor preparing at least one super-frame to be comprised of the first disparity map and the first confidence map, and the computer processor preparing at least one super-frame to be comprised of the first disparity map and the second confidence map. In some embodiments, the outputting of the video stream may further be comprised of the computer processor preparing at least one super-frame comprised of a portion of the first confidence map and a portion of the second confidence map. In some embodiments, the first image data may be comprised of stereo-vision data, and the second image data may be comprised of lidar data or radar data or acoustic data.

In some embodiments of this aspect, the outputting of the video stream may be comprised of the computer processor preparing each super-frame of the video stream to be comprised of: a two-dimensional (2D) image of the scene, a depth map of the scene, and a certainty map of the scene. In some embodiments, the preparing of each super-frame by the computer processor may be comprised of temporally and spatially matching pixels of the 2D image of the scene, pixels of the depth map of the scene, and pixels of the certainty map of the scene. In some embodiments, the outputting of the video stream may be comprised of the computer processor encoding encode disparity information from the first disparity map and confidence information from the first and second confidence maps to reduce a data size of the video stream. In some embodiments, the outputting of the video stream may be comprised preparing two-dimensional (2D) color images such that: each 2D color image is comprised of a plurality of pixels, an alpha-channel transparency of each pixel is proportional to a confidence value for the pixel, and colors of the 2D color images indicate depth ranges.

According to another aspect of the present technology, a stereo vision system is provided. The system may be comprised of: a stereo camera system configured to capture of a sequence of pairs of images, each pair of images being comprised of first image and a second image captured simultaneously; and a computer processor programmed to receive a stream of image data from the stereo camera system, with the image data corresponding to the sequence of pairs of images. The computer processor also may be programmed to, for each of the pairs of images: rectify the first and second images to produce a two-dimensional (2D) pixel map of matched pixels, determine a depth value for each pixel of the pixel map, and determine a confidence value for the depth value for each pixel of the pixel map. The computer processor also may be programmed to, issue a control signal when at least one of the confidence values indicates an image abnormality.

In some embodiments of this aspect, the image abnormality may correspond to one or more pixels of a portion of the confidence map having a confidence value below a predetermined threshold value. In some embodiments, the image abnormality may correspond to one or more pixels of a portion of the confidence map having a confidence value below a predetermined threshold value for two or more consecutive pairs of images of the sequence. In some embodiments, the image abnormality may be comprised of a plurality of pixels of a contiguous region of the confidence map. In some embodiments, the control signal may be configured to cause an audible sound, which may be a pre-recorded message. In some embodiments, the control signal may be issued to an engine control module of a vehicle. In some embodiments, for each pixel of the pixel map, the confidence value may be determined based on a presence or absence of an edge in the pixel, an illumination level of the pixel, and a texture value of the first and second images from which the pixel map is produced.

In some embodiments of this aspect, the computer processor may be programmed to output a sequence of super-frames corresponding to the sequence of pairs of images, with each of the super-frames being comprised of a 2D image and a confidence map corresponding to the 2D image. In some embodiments, the 2D image may be the first image or the second image. In some embodiments, the computer processor may be programmed to output the sequence of super-frames as a display signal that causes a display to show the 2D image and a visible confidence indicator corresponding to the confidence map. The display signal may cause the confidence indicator to be displayed on a pixel-by-pixel basis as a transparency of each pixel of the 2D image. In some embodiments, each of the super-frames may be comprised of the 2D image, the confidence map, and a disparity map corresponding to the 2D image.

According to another aspect of the present technology, a non-transitory computer-readable storage medium is provided in which is stored code that, when executed by a computer processor, causes the computer processor to perform a method of a stereo vision system. The method may be comprised of: the computer processor receiving a stream of image data from a stereo camera system, with the image data corresponding to the sequence of pairs of images, and with each pair of images being comprised of first image and a second image captured simultaneously; and, for each of the pairs of images, the computer processor: rectifying the first and second images to produce a two-dimensional (2D) pixel map of matched pixels, determining a depth value for each pixel of the pixel map, and determining a confidence value for the depth value for each pixel of the pixel map; and the computer processor issuing a control signal when at least one of the confidence maps indicates an image abnormality.

In some embodiments of this aspect, the image abnormality may correspond to one or more pixels of a portion of the confidence map having a confidence value below a predetermined threshold value. In some embodiments, the image abnormality may correspond to one or more pixels of a portion of the confidence map having a confidence value below a predetermined threshold value for two or more consecutive pairs of images of the sequence. In some embodiments, the image abnormality may be comprised of a plurality of pixels of a contiguous region of the confidence map.

In some embodiments of this aspect, the control signal may be configured to cause an audible sound. For example, the audible sound may be a pre-recorded message. In some embodiments, the control signal may be issued to an engine control module of a vehicle. In some embodiments, for each pixel of the pixel map, the confidence value may be determined based on a presence or absence of an edge in the pixel, an illumination level of the pixel, and a texture value of the first and second images from which the pixel map is produced.

In some embodiments of this aspect, the method may further be comprised of the computer processor outputting a sequence of super-frames corresponding to the sequence of pairs of images, each of the super-frames being comprised of a 2D image, a disparity map corresponding to the 2D image, and a confidence map corresponding to the 2D image. In some embodiments, the 2D image may be the first image or the second image. In some embodiments, the outputting of the sequence of super-frames may be comprised of outputting a display signal that causes a display to show the 2D image and a visible confidence indicator corresponding to the confidence map. In some embodiments, the display signal may cause the confidence indicator to be displayed on a pixel-by-pixel basis as a transparency of each pixel of the 2D image. In some embodiments, each of the super-frames may be comprised of the 2D image, the confidence map, and a disparity map corresponding to the 2D image.

The foregoing features may be used, separately or together in any combination, in any of the embodiments discussed herein.

BRIEF DESCRIPTION OF DRAWINGS

The present patent or patent application file contains at least one drawing executed in color. Copies of this patent or patent application publication with color drawings will be provided by the Office upon request and payment of the necessary fee.

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
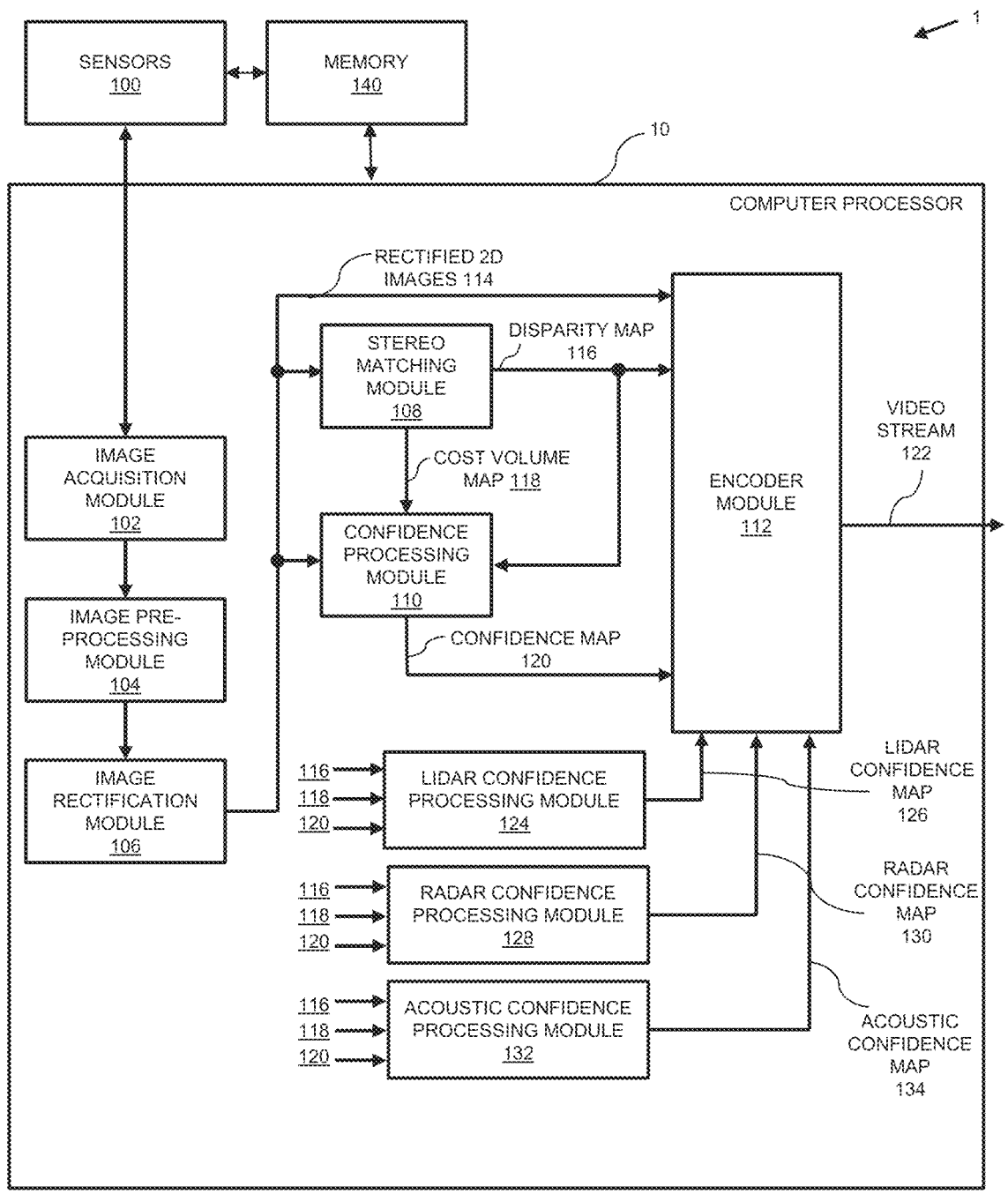
FIG. 1 shows a block diagram of a stereo vision system, according to some embodiments of the present technology.

Sensor information from different types of sensor systems (e.g., a lidar system, a radar system, a mono-vision camera system, a stereo-vision camera system, a temperature measurement system (e.g., a thermocouple), an acoustic system (e.g., a ultrasound transducer system, an audible-sound microphone system, etc.) may be used by a vehicle to obtain information about the vehicle's surroundings while the vehicle is in motion, to enable the vehicle's electronic control system to make decisions about how to operate the vehicle and/or to provide useful information for a driver to assist the driver in operating the vehicle. For example, sensor information may be used by the control system to adjust the vehicle's speed (e.g., accelerate or decelerate), to deploy safety measures (e.g., turn on warning flashers, windshield wipers, etc.), to steer away from an object in the vehicle's path, etc. In another example, sensor information may be used by the control system to warn the driver of a specific object in the vehicle's path. In some embodiments of the present technology, the control system may be a centralized computer system comprised of ECUs configured to control various aspects of operation of the vehicle. Each of the ECUs may be comprised of software and/or hardware configured to receive data from one or more sensors and to process the data to output one or more control signals used to operate part of the vehicle. As noted above, there may be over one hundred ECUs in operation in a moving vehicle. Some ECUs may operate independently of other ECUs, and some ECUs may operate interdependently with one or more other ECUs. In some other embodiments of the present technology, the vehicle's electronic control system may be decentralized. For example, a battery management ECU may operate as a separate system that is independent of, e.g., a speed control ECU. Each ECU may receive sensor information from one type of sensor or a plurality of types of sensors. For example, a cabin-temperature ECU may receive sensor information from one or more thermometers located at different regions of the cabin of the vehicle, and may use the sensor information to control a heater and/or an air conditioner to maintain the temperature of the cabin to a temperature set by an occupant of the vehicle. In another example, a steering ECU may receive sensor information from various combinations of one or more sets of cameras for stereo imaging, one or more radar systems, one or more lidar systems, one or more tire-pressure gauges, one or more microphones, one or more cameras for 2D imaging, and one or more navigation systems (e.g., GPS systems), and may use the sensor information to determine the best course of action to steer the vehicle safely to a destination.

The inventors have recognized and appreciated that, to optimize use of data from different types of sensors, it is important to know the level of confidence or certainty of measurements from each of the sensors. According to some embodiments of the present technology, confidence information may be used to determine which sensor or which combination of sensors is or are to be used for data to determine distance to objects. Conventional sensors typically report a measurement or an estimated measurement without reporting an error estimate (e.g., an error bar) indicating a confidence level for the measurement, which makes accurate fusion difficult. However, as noted above, functionally safe systems, which are particularly important for automotive applications, rely on sensor measurements to make decisions that may affect the safety of human lives. Therefore, there is heightened interest in providing the vehicle's electronic control system with accurate sensor data, which may entail providing the control system with a level of confidence for the sensor data. Armed with confidence data, the control system may be better able to make decisions regarding whether the sensor data is sufficiently trustworthy to be used to control the vehicle or whether the sensor data is not sufficiently reliable and should not be used. As will be appreciated, although sensor fusion may be performed by a central control system to combine data from different types of sensors, in some embodiments of the present technology sensor fusion may be performed by one or more of the vehicle's ECUs or by an auxiliary system that operates in conjunction with the ECUs and/or the central control system.

The inventors have recognized and appreciated that a confidence level of an estimate may be used in a Bayesian inference to update the probability for a hypothesis or estimate, as more evidence or information becomes available. Sensor data from various sensors of the same type and/or of different types, deployed on a vehicle, may be used to corroborate sensor data from a particular sensor deployed on the vehicle. The inventors have recognized and appreciated that a sensor that reports confidence ranges for depth estimates may lead to safer vehicles by enabling the vehicles' driver assistance systems to make decisions based on reliable data, which is especially important for autonomous vehicles that may not be controlled by human drivers. For example, if a vehicle is traveling at a cruising speed typical of highway driving, and a sensor (e.g., a camera) becomes partially obstructed such that the sensor incorrectly detects an object to be in close range to the vehicle (e.g., due to debris on the sensor), based on various factors that factor into an analysis of an image captured by the sensor, a stereo vision system according to some embodiments of the present technology may determine and output a confidence indicating a relatively low level of certainty for that sensor data corresponding to that object and therefore that sensor data may be disregarded. This may enable the vehicle to be controlled to continue on its path at the cruising speed or to gently reduce speed to increase observation time instead of being controlled to emergency brake, e.g., suddenly apply the vehicle's brakes to avoid hitting a potentially false (i.e., non-existent) object, which may increase the vehicle's chances of being rear-ended. In some embodiments, the confidence associated with sensor data may be used to determine whether the sensor data may be used or whether sensor data from another sensor having a relatively higher confidence should be used instead. For example, if depth information from the sensor data indicates an object in the vehicle's path, but the depth information is associated with a low confidence value, the vehicle may be controlled to reduce its traveling speed to enable the purported object to be observed over more time and/or to enable the purported object to be cross-checked by other sensor systems. As discussed below, different types of sensor systems (e.g., systems based on radar, lidar, acoustics, etc.) may be used to corroborate or supplement data obtained by stereo-vision techniques, according to various embodiments of the present technology.

The inventors have recognized and appreciated that a confidence level or degree of certainty of depth estimates from each sensor may be used advantageously to increase passenger safety by enabling driver assistance systems to determine whether a particular sensor is partially or wholly malfunctioning (e.g., partially or wholly covered by debris). In some embodiments, information derived from confidences levels may be used to alert a driver of an abnormality in a sensor. In some embodiments, a stereo vision system or a device that operates in conjunction with the stereo vision system may track occurrences of low confidences (e.g., values below a threshold confidence level) over a plurality of images and may use, e.g., a frequency of the low confidences to determine whether a sensor may be functioning abnormally.

According to some embodiments of the present technology, a stereo vision system may be configured to determine and output an overall confidence for an image. The terms "confidence," "confidence range", and "confidence level" may be used interchangeably herein. The image may be of a scene captured by sensors on a moving vehicle (e.g., a car, a truck, a plane, etc.) or may be of a scene captured by sensors mounted on a fixed structure (e.g., a street lamp, an airport tower, a dwelling, an office building, etc.). The stereo vision system may be a stand-alone system deployed on a vehicle or may be incorporated in a vehicle's control system. In some embodiments, the stereo vision system may determine and output a confidence for each region of a plurality of regions of an image. For example, an image may be divided into quadrants (e.g., top left, top right, bottom left, bottom right) and the stereo vision system may determine and output a confidence for each quadrant. In some embodiments, the stereo vision system may determine and output a confidence for each pixel of an image.

According to some embodiments of the present technology, a stereo vision system may be configured to output a depth map corresponding to an image captured of a scene. The image may be a digital image as captured or may be digitized from an analog image. The depth map may be a map of depth values or distances from sensors of the stereo vision system to objects in the scene. The depth map may be comprised of pixels corresponding to pixels of the image, such that each pixel of the depth map (and each pixel of the image) may have an associated depth value. The stereo vision system also may be configured to output confidence data together with the depth map. In some embodiments, the confidence data may be a confidence map that indicates a certainty or confidence of the depth map. In some embodiments, the confidence map may be comprised of pixels corresponding to the pixels of the depth map (and the image), such that each pixel of the confidence map (and each pixel of the image) may have an associated confidence. In some embodiments, the confidence map may represent estimates of confidences as error bars, as standard-deviation values, in buckets (e.g., high confidence, medium confidence, low confidence), or any other metric capable of indicate a quality level of each estimated confidence.

As noted above, an estimate of a depth for each pixel of an image may be computed from a disparity map, because the depth of the pixel is inversely proportional to the disparity of the pixel. As such, the terms "depth map" and "disparity map" may be used interchangeably herein, because they provide nearly identical information about the captured scene in the image and they are related by a simple algebraic transformation known in the art.

According to some embodiments of the present technology, an autonomous vehicle and/or an advanced driver assistance system (ADAS) may use a depth map and confidence values associated with the depth map advantageously to avoid an accident and/or to alert a driver when there is unreliable data. In some embodiments, because a confidence value may be provided for each pixel of the depth map, there may be no need to discard an entire frame of a captured video sequence of a scene when there are some pixels with low confidence values. Instead, the pixels with low confidence values may be discarded and the remaining pixels, which have sufficiently high confidence values, may be used for depth calculations. This selectivity is very much like human vision, where a driver may naturally ignore obstructing objects, such as a vehicle's A pillar, a vehicle's windshield wipers, etc., when processing a scene in a field of view while driving. That is, the driver would automatically disregard the obstructing object while assessing the scene in the field of view. In some embodiments, a confidence map may increase sensor availability because a frame of a video sequence may be used even if some of the frame may disregarded, which enables the vehicle's sensor to operate at a higher duty cycle in a larger range of environmental situations. For example, the sensor may operate even when there is dirt on a portion of a lens of the sensor, or when windshield wipers may partially obstruct a field of view of the sensor, or when a section an image captured by the sensor is over-exposed, or when a section of an image captured by the sensor has a low light level, or when there is any situation where some pixels of an image captured by the sensor may have useful data even if some other pixels of the image may have data that should be disregarded. By providing a confidence map comprised of confidence values on a per pixel basis, a vehicle's electronic control system may be enabled to pay attention to areas of a depth map that are valid and have relatively high confidence values.

According to some embodiments of the present technology, an autonomous vehicle may fuse information from different sensors, such as camera, lidar, radar, and/or ultrasonic sensors, to increase reliability and safety. Such sensors may report or provide information on distances to objects, but when different distances are reported for different sensors, it may be unclear which sensor to trust. In some embodiments, sensor fusion algorithms may combine data from different sensors and may output fused information that has less uncertainty than would be possible when unfused information from one or another of the sensors is used individually. The inventors have recognized and appreciated that sensor fusion algorithms may be enhanced to increase the certainty of the fused information, by providing the algorithms with a certainty parameter (e.g., a variance) for each of the different sensors. In some embodiments, sensor fusion may be enabled for two or more sensors having different but overlapping fields of view, because confidence maps may be determined for the different sensors on a pixel-by-pixel basis. In some embodiments, radar distance estimates for an object may be compared with stereo-vision distance estimates for the object when there are overlapping fields of view encompassing the object. For example, sensors on a car traveling in clear weather during the day might have very high confidence values for stereo-vision distance determinations based on images captured by cameras on the car and therefore the stereo-vision distance determines may be trusted by the car's electronic control system, especially for objects at ranges or distances of 300 meters or greater, where other sensors on the car may not be expected to return high confidence values. If the weather turns bad (e.g., heavy fog, pouring rain, etc.) there may be lower visibility and consequently the optical attenuation may cause the stereo-vision distance estimates to deteriorate and the associated confidence values to be low. The car's control system may then switch to obtain distance estimates from radar data instead of data from the cameras. Similarly, if the car is traveling at night or at low ambient light levels without fog or other precipitation, the car's control system may switch to obtain distance estimates from lidar data instead of from radar data or data from the cameras, because a typical lidar system has its own active source of illumination. In some embodiments, instead of the car's control system determining when to switch between stereo-vision distance estimates, lidar distance estimates, radar distance estimates, or acoustic distance estimates, switching may be performed by the car's stereo-vision system, which may be the car's main sensor system. As will be appreciated, although the foregoing example relates to distance estimates for a car, the present technology is not limited to cars and may be applicable to other vehicles (e.g., trucks and other road vehicles, trains and other rail vehicles, boats and other seafaring vehicles, airplanes and other aeronautical vehicles, etc.).

FIG. 1 shows a block diagram of a stereo vision system 1 configured to provide a value for stereo-matching confidence or certainty, according to some embodiments of the present technology. The stereo vision system 1 may be comprised of a computer processor 10 coupled to a plurality of sensor systems and configured to receive measurements or sensor data from each of the sensor systems. In some embodiments, the sensor systems coupled to the processor 10 may be comprised of an imaging system comprised of sensors 100, which may be cameras, lidar sensors, radar sensors, and/or ultrasound sensors. In some embodiments, the stereo vision system 1 may be mounted on a vehicle capable of autonomous motion (i.e., without human control) and/or semiautonomous motion (i.e., with human control or limited human control). For example, the vehicle may be an automobile, a truck, a robot, a seafaring vessel, an aviation vehicle, and the like.

According to some embodiments of the present technology, the sensors 100 may be comprised of two stereo cameras 100 configured to capture images of the vehicle's environment simultaneously, i.e., at the same or nearly the same moment of time. To simplify notation, the cameras 100 may be referred to herein as "left" and "right" cameras, even though they may be positioned vertically (e.g., top and bottom) relative to each other, or diagonally relative to each other, or offset in different range bins (e.g., one camera is at a front portion of the vehicle and the other camera is at a rear portion of the vehicle). The cameras 100 may be, e.g., color CMOS (complementary metal-oxide-semiconductor) cameras, grayscale CMOS cameras, CCD (charge-coupled device) cameras, SWIR (short-wavelength infrared) cameras, LWIR (long-wavelength infrared) cameras, or focal-plane array sensors.

Figure 2:
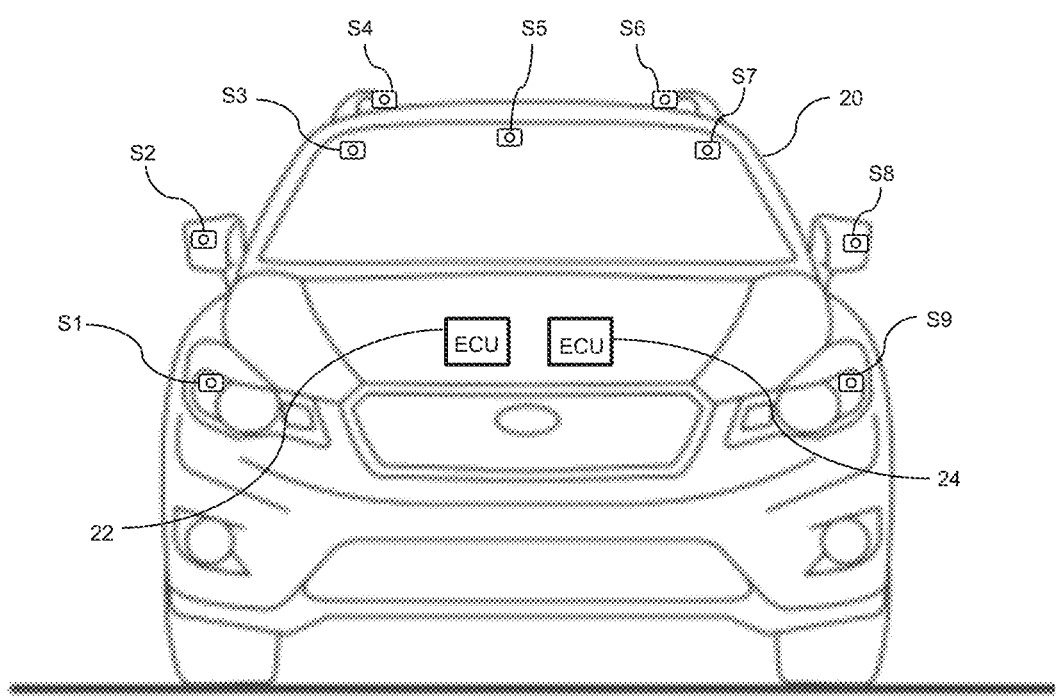
FIG. 2 shows an arrangement of sensors and electronic control units arranged on a vehicle, according to some embodiments of the present technology.

According to some embodiments of the present technology, sensors S1, S2, S3, S4, S5, S6, S7, S8, S9 may be located at a plurality of different locations on a vehicle 20, as schematically depicted in FIG. 2. In some embodiments, some of the sensors S1, S2, . . . , S9 may be located internal to a cabin of the vehicle 20 and therefore may be protected from dust and rain. In some embodiments, some of the sensors S1, S2, . . . , S9 may be located external to the cabin of the vehicle 20 and therefore may enable a baseline (i.e., a distance between two sensors) to be greater than a width of the cabin, which may enable objects at a relatively farther distance to be detected compared with baselines limited to the width of the cabin. In some embodiments, the sensors S1, S2, . . . , S9 may be coupled wirelessly or by wires to one or more ECUs 22, 24 configured to receive data from the sensors S1, S2, . . . , S9 and/or to supply power to the sensors S1, S2, . . . , S9. In some embodiments, at least some of the ECUs 22, 24 may be part of the computer processor 10. In some other embodiments, at least some of the ECUs 22, 24 may be located external to the computer processor 10 and may be configured to transmit signals wirelessly or by wires to the computer processor 10. In some embodiments, only two cameras are needed, such as a pair of cameras in the headlights (e.g., S1 and S9); or a pair of cameras in the side view mirrors (e.g., S2 and S8); or a pair of cameras in the windshield (e.g., S3 and S7 or, alternatively, S3 and S5); or a pair of cameras on the roof (e.g., S4 and S6).

Figure 3:
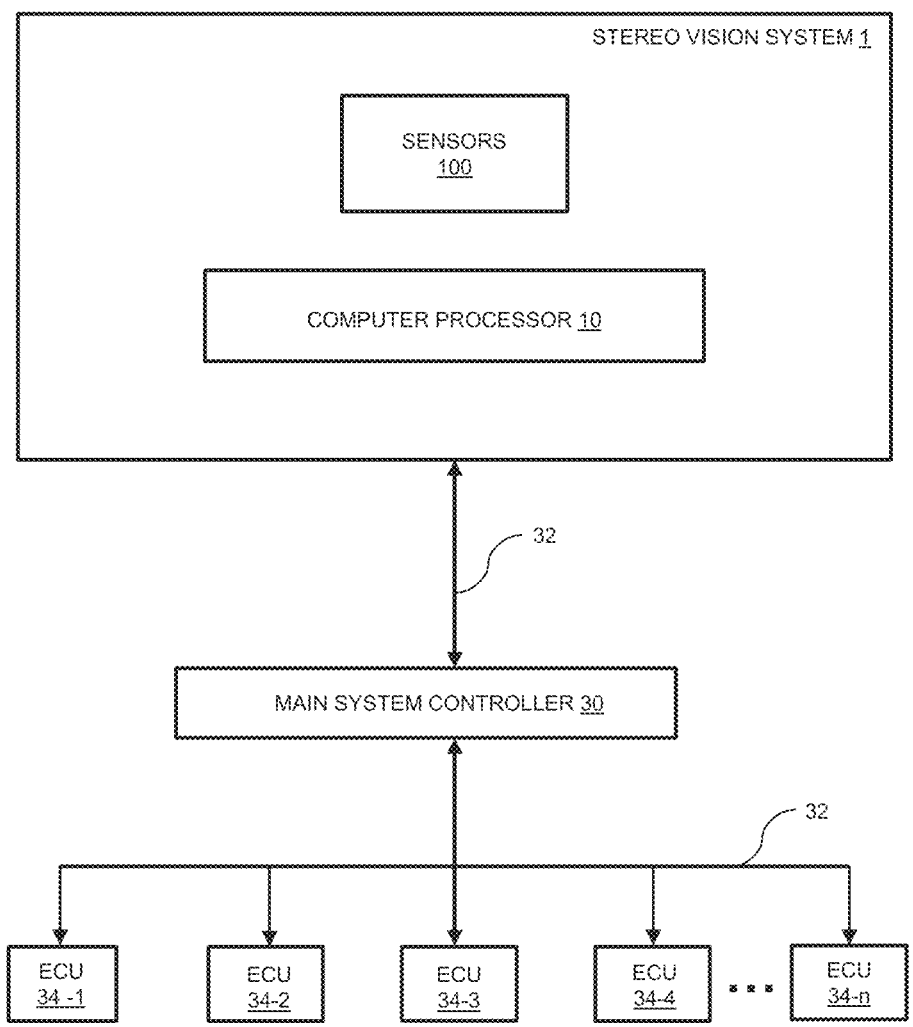
FIG. 3 shows a block diagram of a stereo vision system coupled to a control system, according to some embodiments of the present technology.

According to some embodiments of the present technology, the stereo vision system 1 may be coupled to a main system controller 30 of the vehicle, as schematically shown in FIG. 3. In some embodiments, the main system controller 30 may be the vehicle's control system, which may be configured to control all automated aspects of vehicle operation. In some embodiments, the stereo vision system 1 may be configured to be commanded by the main system controller 30, and may communicate signals to and from the main system controller 30 via a command and control line 32. As will be appreciated, the command and control line 32 may be a wired communication mechanism (e.g., a data bus, a communication line) or may be a wireless communication mechanism using communication techniques known in the art. In some embodiments, the main system controller 30 may be comprised of a computer configured to orchestrate high-level functions (e.g., automatic emergency braking, route selection, etc.) and to communicate with various sub-systems or ECUs (e.g., the stereo vision system 1) to carry out the high-level functions. In some embodiments, common communication protocols may be used for communication via the command and control line 32 (e.g., Ethernet, CAN (Controller Area Network), I2C (Inter-Integrated Circuit), LIN (Local Interconnect Network), etc.). Although the stereo vision system 1 is shown in FIG. 3 to be separate from the main system controller 30, the stereo vision system 1 may, in some embodiments, be part of the main system controller 30 and may, in some embodiments, be physically located in a housing of the main system controller 30.

Returning to FIG. 1, the cameras 100 may be coupled to an image acquisition module 102 wirelessly or by a wired connection, according to some embodiments of the present technology. In some embodiments, image data of a scene captured by the cameras 100 may be transferred to the image acquisition module 102 via a known communication interface (e.g., a USB (Universal Serial Bus) connector, an Ethernet connector, a MIPI (Mobile Industry Processor Interface) CSI (Camera Serial Interface) connector, GMSL (Gigabit Multimedia Serial Link) connector, Flat Panel Display Link (FPD-Link) connector, and the like). In some embodiments, the cameras 100 may be configured to transmit the image data to the image acquisition module 102 in real time or nearly real time, directly or via a buffer memory device (e.g., RAM), which may be incorporated in the cameras 100. In some embodiments, the cameras 100 may be associated with a data-storage memory device 140 accessible by the image acquisition module 102 as well as other parts of the computer processor 10, and the cameras 100 may be configured to transmit the image data to the data storage device 140. In some embodiments, the cameras 100 may be video cameras configured to capture streams of video data of the scene. The streams of video data may be comprised of a left stream and a right stream, with each stream being comprised of a sequence of frames. Thus, the term "image data" as used herein may refer to frames of video data, in some embodiments.

According to some embodiments of the present technology, the image acquisition module 102 may be configured to digitize the image data from the cameras 100 to produce raw digital image data or "raw image data". In some embodiments, the image acquisition module 102 may provide the raw image data to an image pre-processing module 104. In some embodiments, the image acquisition module 102 may provide the raw image data to the memory 140, which may store the raw image data for future processing.

According to some embodiments of the present technology, the image pre-processing module 104 may be configured to correct the raw image data to produce corrected left and right images. For example, the image pre-processing module 104 may perform any one or any combination of: demosaicing; auto-focus, auto-exposure, and auto-white-balance correction; vignetting; noise reduction; bad-pixel filtering; HDR (high-dynamic-range) look-up-table color processing; and image compression. The corrected left and right images may be transferred to an image rectification module 106.

According to some embodiments of the present technology, the image rectification module 106 may be configured to rectify the corrected left and right images by warping them so that corresponding rows of pixels of the corrected left and right images are on a same epipolar plane. After warping, the image rectification module 106 may output left and right rectified 2D images 114, which may be color images or grayscale images. As will be appreciated, image rectification is a known technique used to simplify matching of common objects in the corrected left and right images. The image rectification module 106 may provide the left and right rectified 2D images 114 to a stereo matching module 108, a confidence processing module 110, and an encoder module 112.

According to some embodiments of the present technology, the stereo matching module 108 may be configured to compute a disparity between each matching pixel pair in the rectified 2D images 114. Processing performed by the stereo matching module 108 may, in some embodiments, be comprised of four procedures: a cost computation procedure, a cost aggregation procedure, a disparity computation procedure, and a disparity refinement procedure, each of which is discussed below.

According to some embodiments of the present technology, the cost computation procedure may be comprised of constructing a three-dimensional (3D) cost volume map 118, which also may be referred to as a "disparity-space image," by computing matching costs for each pixel at each disparity value of a set of possible disparity values. As discussed below, a cost volume (or, more precisely, a matching cost volume) may be determined as the product of $W \times H \times D$, where W and H are the width and height dimensions of each image, and where D is the number of disparity hypotheses or possible disparities. A matching cost for a particular pixel and a particular disparity value represents how unlikely that particular pixel has that particular disparity value. Typically, for a given pixel, the disparity value with the lowest matching cost is chosen to be used in a disparity map, discussed below. This approach to selecting the disparity value for a given pixel is the so-called winner-takes-all (WTA) approach, where the winner is the disparity value with the lowest matching cost, i.e., the best one among all the disparity hypotheses. Matching costs may be computed using known techniques such as, for example, an absolute difference technique, a mutual information (MI) technique (e.g., a Hierarchical MI (HMI) technique), a normalized cross-correlation (NCC) technique, a Hamming distance technique, etc. In some embodiments, the NCC technique may be used to match costs for two sub-windows (one sub-window in each of the left and right rectified 2D images 114) around a pixel under consideration, as described in "Evaluation of Cost Functions for Stereo Matching" by H. Hirschmuller et al. (2007 IEEE Conference on Computer Vision and Pattern Recognition). In some embodiments, the Hamming distance technique may be used in a census transformation, in which neighboring pixels surrounding a pixel under consideration is mapped into a bit string depending on whether an intensity value of these pixels is greater or smaller than that of the pixel under consideration, as described in "Census Filtering Based Stereomatching Under Varying Radiometric Conditions" by S. Sarika et al. (2015 Procedia Computer Science).

Figure 4A:
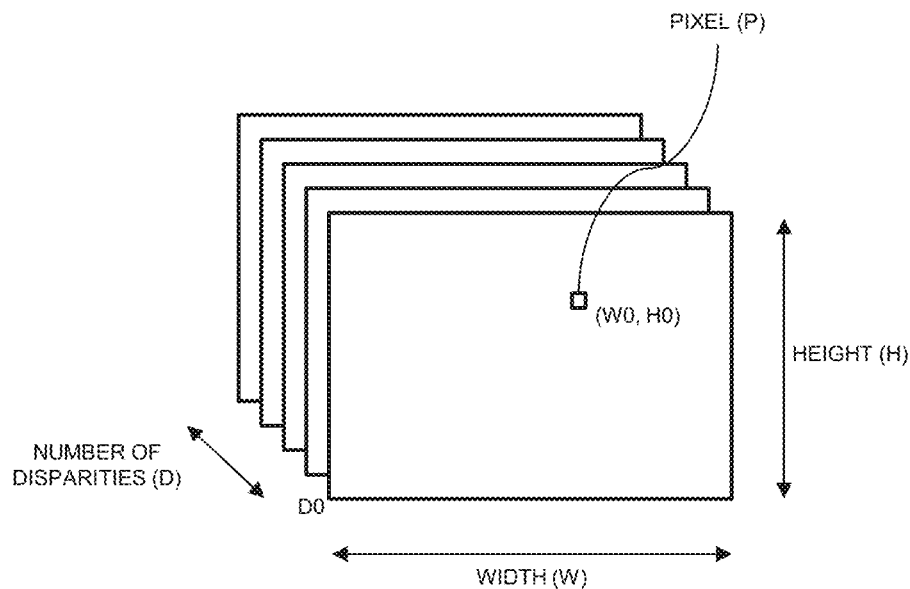
FIG. 4A shows a diagram for understanding how a cost volume may be determined, according to some embodiments of the present technology.

FIG. 4A shows a diagram for understanding how the cost volume map 118 may be determined, according to some embodiments of the present technology. In cost-volume analysis, the cost volume map 118 may be constructed by collecting cost curves (e.g., the cost curve 400) for every pixel in the left rectified image (or the right rectified image) of the rectified 2D images 114. The cost volume map 118 has $H \times W \times D$ elements, where H is the height of the image (e.g., H may be the number of pixels in the row direction or, if less precise matching is permitted, may be the number of pixel groups in the row direction), W is the width of the image (e.g., W may be the number of pixels in the column direction or, if less precise matching is permitted, may be the number of pixel groups in the column direction), and D is the number of disparities searched. Thus, in simplified terms, the cost volume map 118 may be thought of as comprising a cost curve for each pixel coordinate (row and column). In some embodiments, the cost volume map 118 may be refined (e.g., by filtering) to obtain more reliable matching costs, using techniques known in the art. For example, techniques described in "Fast cost-volume filtering for visual correspondence and beyond" by C. Rhemann et al. (2011 Conference on Computer Vision and Pattern Recognition).

Figure 4B:
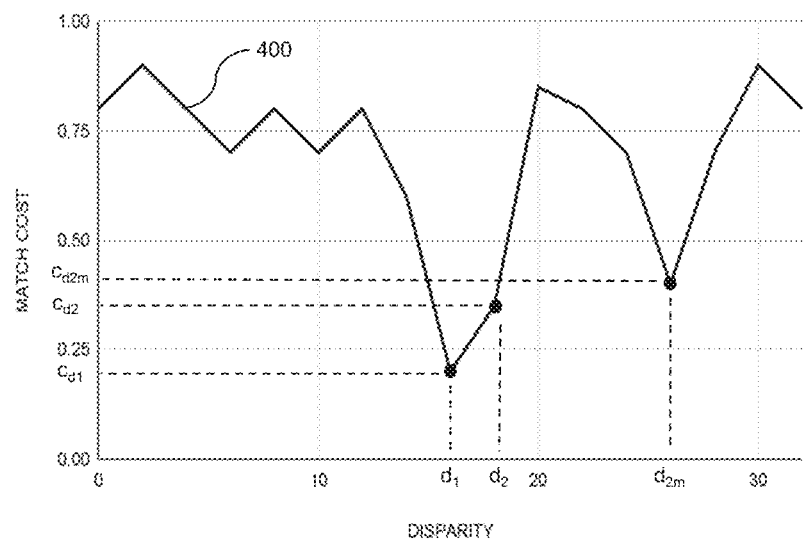
FIG. 4B shows an example of a cost curve, according to some embodiments of the present technology, according to some embodiments of the present technology.

FIG. 4B shows an example of a cost curve 400, which may be used to describe a cost matching procedure, according to some embodiments of the present technology. As will be appreciated, cost matching typically may be performed between a pixel P having (row, column) coordinates of (H0, W0) in the left rectified image with a pixel having coordinates of (H0, W0+D0) in the right rectified image. The cost curve 400, which shows a relationship between matching cost and disparity, may represent a particular pixel under consideration. (The term "matching cost" referred may also be referred to as "match cost" or "cost" herein.) As shown in FIG. 4B, the cost curve 400 has a lowest global minimum cost of cdi when the disparity is $d_1$, and has a second lowest global minimum cost of $c_{d2}$ when the disparity is $d_2$, and has a second lowest local minimum cost of $c_{d2m}$ when the disparity is $d_{2m}$. As will be appreciated, the term "global" may be used for a value evaluated across all points in the cost curve 400, and the term "local" may be used for a value evaluated across a portion of the cost curve 400.

According to some embodiments of the present technology, a value for matching cost may be determined using the NCC technique (see above) for sub-windows spanning 5 pixels in a column direction and spanning 5 pixels in a row direction ("5×5" sub-windows) around the pixel under consideration in the left and right rectified 2D images 114.

According to some embodiments of the present technology, the cost aggregation procedure may be comprised of aggregating the matching costs over a support region of each pixel, utilizing results of the cost computation procedure. For "local" stereo matching techniques, the support region may be understood to be a weighted sum of the costs in a group of neighboring pixels around the pixel of interest. For "semi-global" and "global" stereo matching techniques, the support region may be understood to be a function of costs for all pixels in the image.

According to some embodiments of the present technology, the disparity computation procedure may be comprised of computing a disparity for each pixel using local or global optimization methods, using results of the cost aggregation procedure, and producing an unrefined disparity map. Computational speed vs. accuracy may determine the choice between local and global optimization methods. For example, a local method may be used where speed is desired over accuracy, whereas a global method may be used where accuracy is desired over speed. In some embodiments, a local optimization method such as block matching may be used. In some embodiments, a global optimization method such as Semi-Global Matching (SGM) may be used.

According to some embodiments of the present technology, the disparity refinement procedure may be comprised of filtering the unrefined disparity map, to produce a 2D disparity map 116 for the left and right rectified 2D images 114. The disparity refinement procedure is an optional procedure to correct the disparity values. Traditional refinement steps include a left-right check, hole filling, smoothing filters, and outlier detection and removal.

According to some embodiments of the present technology, the stereo matching module 108 may employ stereo matching techniques that are different from what is described above. For example, the stereo matching module may use one or more techniques described in "Stereo matching algorithm based on deep learning: A survey" by Mohd Saad Hamid et al. (2020 Journal of King Saud University—Computer and Information Sciences) and/or one or more techniques described in "Stereo Processing by Semi-Global Matching and Mutual Information" by H. Hirschmuller (2008 IEEE Transactions on Pattern Analysis and Machine Intelligence).

According to some embodiments of the present technology, the stereo matching module 108 outputs the 2D disparity map 116 to the encoder module 112 and the confidence processing module 110 of the processor 10 of the stereo vision system 1, as shown in FIG. 1. In some embodiments, the stereo matching module 108 also outputs the 3D cost volume map 118, discussed above in connection with deriving the disparity map 116, to the confidence processing module 110.

According to some embodiments of the present technology, the confidence processing module 110 is configured to receive as inputs the left and right 2D rectified images 114 from the image rectification module 106, the cost volume map 118 from the stereo matching module 108, and the 2D disparity map 116 from the stereo matching module 108, and to determine an accuracy of the disparity estimated for each pixel of the rectified images 114 from these inputs.

The confidence processing module 110 may be configured to compute a confidence value for each frame of a video stream, according to some embodiments of the present technology. In some embodiments, the confidence processing module 110 may compute a confidence value for each pixel of each frame of the video stream. Therefore, it should be understood that the term "image" herein may encompass a frame of a video stream.

Referring back to FIG. 1, the confidence processing module 110 may output confidence information to the encoder module 112, according to some embodiments of the present technology. The confidence information, in some embodiments, may be a confidence map 120 for each frame of the video stream. The confidence map 120 may have the same dimensions as the disparity map 116 output by the stereo matching module 108 to the encoder module 112. In some embodiments, the confidence map 120 may include confidence information for each pixel of the frame, indicating a value representing a confidence level of a depth estimate for a corresponding pixel in the disparity map 116. In some embodiments, the value representing the confidence level of a particular pixel may be a root-mean-square error of the disparity or depth determined for that pixel, or may be 95% confidence interval of the disparity or depth determined for that pixel, or may be any measure of variability (e.g., a standard deviation, a standard error of the mean, a confidence interval, a data range, a percentile, etc.). Other confidence metrics may be used, such as those described in "On the confidence of stereo matching in a deep-learning era: a quantitative evaluation" by M. Poggi et al. (2021 IEEE Transactions on Pattern Analysis & Machine Intelligence) and in "A Quantitative Evaluation of Confidence Measures for Stereo Vision" by X. Hu et al. (2012 IEEE Transactions on Pattern Analysis and Machine Intelligence).

Figure 5:
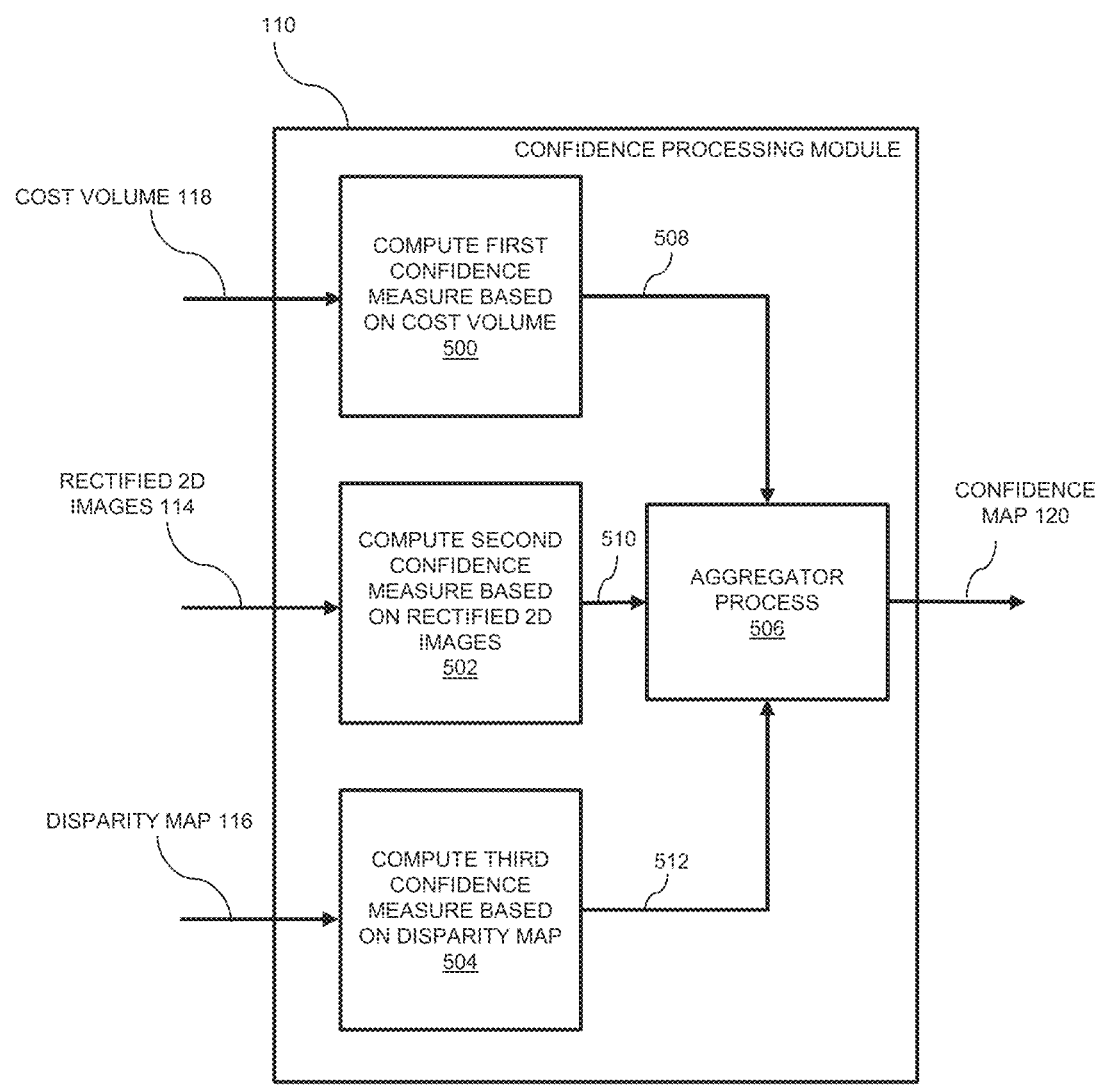
FIG. 5 is a diagram showing processes performed by a confidence processing procedure, according to some embodiments of the present technology.

FIG. 5 is a diagram showing processes performed by the confidence processing module 110, according to some embodiments of the present technology. In some embodiments, at block 500, a first confidence measure process computes a first confidence map 508 based on the cost volume 118 received from the stereo matching module 108. In some embodiments, a winner margin of the cost curve (e.g., the cost curve 400) for each pixel may be computed and used as a confidence value for that pixel on the first confidence map 508. The winner margin (WMN) may be defined as a difference between the second lowest local minimum cost $c_{d2m}$ and the lowest global minimum cost $c_{d1}$, normalized over the entire cost curve, or $$WMN(p) = \frac{c_{d_{2m}}(p) - c_{d_1}(p)}{\sum_{i \in D} c_i},$$

where p is the coordinate of the pixel under consideration, c is the match cost, and D is the set of disparities searched. In some embodiments, the first confidence map 308 can also be derived from other measures, such as those summarized in "On the confidence of stereo matching in a deep-learning era: a quantitative evaluation" by M. Poggi et al. (2021 IEEE Transactions on Pattern Analysis & Machine Intelligence).

According to some embodiments of the present technology, at block 502, a second confidence measure process of the confidence processing module 110 computes a second confidence map 510 based on the rectified 2D images 114 received from the image rectification module 106. In some embodiments, texture is measured on the rectified 2D images 114, by, e.g., calculating a derivative (e.g., an x-derivative) of the image data to determine changes in the rectified 2D images 114, and texture values may be used to derive the second confidence map 510. In some embodiments, image texture may be measured using the x-Sobel operator. As will be appreciated, it is known in stereo vision technology that it is difficult to perform 3D reconstruction processing on images with little texture or texture comprised of repeating structures, because of the difficulty in matching textureless features or features that are the same as a plurality of other features in the images. Given this difficulty, the second confidence map 310 may be derived from a grayscale image convolved with the x-Sobel operator:

$$\begin{bmatrix} +1 & 0 & -1 \\ +2 & 0 & -2 \\ +1 & 0 & -1 \end{bmatrix}.$$

Such Sobel convolution or filtering, which is known to emphasize edges in an image, may yield higher values when there are edges in the rectified 2D images 114 and therefore may result in sharper, more well-defined features that may be easier to stereo-match. In some embodiments, in addition to Sobel convolution or instead of Sobel convolution, the second confidence map 510 may be derived by assessing each pixel based on the pixel's intensity, and penalizing pixels having an intensity below a minimum threshold value or above a maximum threshold value. For example, a zero or low confidence value may be determined for each low-intensity or under-illuminated pixel having a signal-intensity level below the minimum threshold value and, similarly, a zero or low confidence value may be determined for each over-illuminated or saturated pixel having a signal-intensity level above the maximum.

According to some embodiments of the present technology, at block 504, a third confidence measure process of the confidence processing module 110 computes a third confidence map 512 based on the disparity map 116 received from the stereo matching module 108. In some embodiments, confidence values for the third confidence map 312 may be computed from a variance in the disparity determined for each pixel of the rectified 2D images 114. In some embodiments, the variance may be a statistical variance relative to the disparities determined for neighboring pixels (e.g., pixels surrounding the pixel under consideration). For example, a pixel with a relatively higher variance may indicate that the pixel is part of a region of the disparity map 116 having noisier (e.g., more scattered) data and therefore may be assigned a relatively lower confidence value. As will be appreciated, noisiness may be indicative of blurriness and may indicate that the sensors used to capture the images (e.g., the cameras 100), or regions of the sensors, may be dirty or partially obscured. Known techniques (e.g., techniques based on Laplace filters and/or Sobel filters) may be used to detect variance in the disparity map 116. In some embodiments, a variance below a threshold variance may indicate that the pixel under consideration is blurry or in a blurry region and therefore may be assigned a low confidence value in the third confidence map 512.

As will be appreciated, although the first, second, and third confidence maps 508, 510, 512 have been described to be comprised of confidence values for each pixel of an image or each pixel of each frame of a video stream, according to some embodiments of the present technology, in some other embodiments one or more of the first, second, and third confidence maps 508, 510, 512 may be comprised of confidence values representing more than one pixel of the image or the frame. For example, each frame of a video stream may be comprised of pixels categorized into n groups, and the confidence processing module 110 may be configured to compute n confidence values (i.e., a confidence value for each of the n groups) for each frame of the video stream.

According to some embodiments of the present technology, at block 506, an aggregator process of the confidence processing module 110 uses the first, second, and third confidence maps 508, 510, 512 and combines the estimated confidence values in the first, second, and third confidence maps 508, 510, 512 to produce the confidence map 120. Thus, the confidence map 120 may be comprised of enhanced confidence values that are best estimates of certainty based on a plurality of measures of confidence. In some embodiments, the aggregator process may be comprised of computing a sum of the confidences for each pixel, and may use the sum as the enhanced confidence value for the pixel in the confidence map 120. In some embodiments, the aggregator process may comprise weighting the confidences in the first, second, and third confidence maps 508, 510, 512 and then computing a weighted sum of the confidences for each pixel, and may use the weighted sum as the enhanced confidence value for the pixel in the confidence map 120. In some embodiments, the aggregator process may comprise, for each pixel, use the confidences for the pixel in the first, second, and third confidence maps 508, 510, 512 as three input values to a look-up table, which may output a single value used as the enhanced confidence value for the pixel in the confidence map 120.

Returning to FIG. 1, the confidence processing module 110 may output the confidence map 120 to the encoder module 112 of the computer processor 10, according to some embodiments of the present technology. The encoder module 112 may be configured to receive the rectified 2D images 114, the disparity map 116, and the confidence map 120, encode the received information, and output a video stream 122 comprised of the encoded information. In some embodiments, the video stream 122 may be provided to the main system controller 30 of the vehicle.

According to some embodiments of the present technology, the video stream 122 may be comprised of a 24-bit color depth video in which each 24-bit color value may be encoded to be a range or distance to the scene captured by the cameras 100. In some embodiments, distances from 0 up to approximately 16,800 meters may be represented with 24 bits, with each color representing a different 1-millimeter portion of the 16,800-meter range. In some embodiments, the video stream 122 may be comprised of 2D frames comprised of pixels, with the pixels of each frame corresponding to the pixels of the rectified 2D images 114. Each pixel of each frame of the video stream 122 may be encoded with an enhanced confidence value. For example, each enhanced confidence value may be an 8-bit unsigned value from 0 to 255, where relatively higher values may indicate a higher level of confidence. In some embodiments, using an 8-bit representation for the enhanced confidence values of the confidence map 120 may enable the confidence map 120 to be displayed as a grayscale image. In some embodiments, the video stream 122 may be comprised of a 24-bit color video stream representing depth or distance and also an 8-bit monochrome video stream representing confidence. Outputting the video stream 122 such that depth data may be separated from confidence data may, in some embodiments, facilitate sensor fusion, where data from different types of sensors (e.g., lidar, radar, ultrasound, cameras, etc.) may be combined to provide enhanced reliability in, e.g., detecting objects and determining distances of the vehicle to the objects. For example, in foggy environments where objects in a scene may not be clearly visible in an image captured by typical cameras, confidence values for pixels of the image may be generally low throughout the entire image. In such a case, the vehicle's control system (e.g., the main system controller 30) may determine that the image is not sufficiently reliable to be used.

According to some embodiments of the present technology, the computer processor 10 of the stereo vision system 1 may be comprised of a lidar confidence processing module 124, and the sensors 100 may be comprised of a lidar sensor configured to illuminate a scene with laser light and to generate lidar image data (e.g., a video stream) and lidar confidence data from reflected light received from the scene, and to output a lidar confidence map 126 to the encoder module 112. Optionally, the lidar image data may be output together with the lidar confidence map 126. In some embodiments, the computer processor 10 may be comprised of a radar confidence processing module 128, and the sensors 100 may be comprised of a radar sensor configured to illuminate a scene with waves of a known wavelength (e.g., 76.5 GHz) and to generate radar image data (e.g., a video stream) and radar confidence data from reflected waves, which have the known wavelength and which have been reflected from the scene, and to output a radar confidence map 130 to the encoder module 112. Optionally, the radar image data may be output together with the radar confidence map 130. In some embodiments, the computer processor 10 may be comprised of an acoustic confidence processing module 132, and the sensors 100 may be comprised of a transducer configured to illuminate a scene with acoustic waves (e.g., ultrasound waves) of a known wavelength (e.g., 20 kHz) and to generate acoustic image data (e.g., a video stream) and acoustic confidence data from reflected waves, which have the known wavelength and which have been reflected from the scene, and to output an acoustic confidence map 134 to the encoder module 112. Optionally, the acoustic image data may be output together with the acoustic confidence map 134. Techniques for determining confidence values for the lidar image data, the radar image data, and the acoustic image data are discussed below.

According to some embodiments of the present technology, the lidar confidence processing module 124 may be configured to receive the disparity map 116 and the cost volume map 118 from the stereo matching module 108, and the confidence map 120 from the confidence processing module 110. Although not shown in FIG. 1, the lidar confidence processing module 124 also may be configured to receive, in some embodiments, one or both of the left and right rectified 2D images 114 from the image rectification module 106. The lidar confidence processing module 124 may use the confidence map 120 and some or all of the other received information (i.e., the disparity map 116 and/or the cost volume map 118 and/or one or both of the rectified 2D images 114) to perform a comparison and to identify regions for which the lidar confidence data has values higher confidence values than corresponding regions of the confidence map 120. In some embodiments, the lidar confidence processing module 124 may provide the encoder module 112 with comparison information together with the lidar confidence map 126. Similarly, in some embodiments, the disparity map 116, the cost volume map 118, and the confidence map 120 may be provided to the radar confidence processing module 128, which may be configured to provide the encoder module 112 with comparison information together with the radar confidence map 130. Likewise, in some embodiments, the disparity map 116, the cost volume map 118, and the confidence map 120 may be provided to the acoustic confidence processing module 132, which may be configured to provide the encoder module 112 with comparison information together with the acoustic confidence map 134.

According to some embodiments of the present technology, the encoder module 112 may use the confidence map 120 and one or more of the lidar confidence map 126, the radar confidence map 130, and the acoustic confidence map 134 to determine whether to encode the video stream 122 to include depth information based only on sensor data obtained by the cameras 100 or to include depth information based only on another sensor system (e.g., the lidar sensor, the radar sensor, the acoustic sensor, another pair of cameras, etc.) or to perform sensor fusion to combine sensor data derived from a plurality of different sensor systems on the vehicle. In some embodiments, the encoder module 112 may be configured to encode the video stream 122 such that image data, depth data, and/or confidence data in the video stream 122 corresponds to the highest confidence values determined from the different sensor systems. In some embodiments, frames of the view stream 122 may be comprised of one or more frames based on the rectified 2D images 114 and the confidence map 120 followed by one or more frames based on the lidar image data and the lidar confidence map 126 followed by one or more frames based on the acoustic image data and the acoustic confidence map 134. In some embodiments, one or more frames of the video stream 122 may each be comprised of a combination of data derived from the different sensor systems. For example, each of the frames of the video stream 122 may be comprised of four quadrants (e.g., top left, top right, bottom left, bottom right) with each quadrant being comprised of sensor data having a highest overall confidence (e.g., a highest average confidence level over the pixels of the quadrant). Therefore, if debris on one or both of the cameras 100 causes the top left quadrant of the confidence map 120 to have the lowest overall confidence compared with the overall confidences of the other sensor systems of the vehicle, but the other three quadrants of the confidence map 120 have the highest overall confidence values, then the top left quadrant of the corresponding frame of the video stream 122 may be replaced with data from the sensor system having the highest overall confidence. As will be appreciated, instead of optimizing the frames of the video stream 122 on a frame-by-frame basis or on a quadrant basis, the frames may be optimized in other ways provide high-reliability estimates of a scene captured by the sensors of the different sensor systems. In some embodiments, when the vehicle is being operated at night or in a dark environment, the encoder module 112 may encode the video stream 122 with, e.g., lidar-based data instead of camera-based data.

Figure 6:
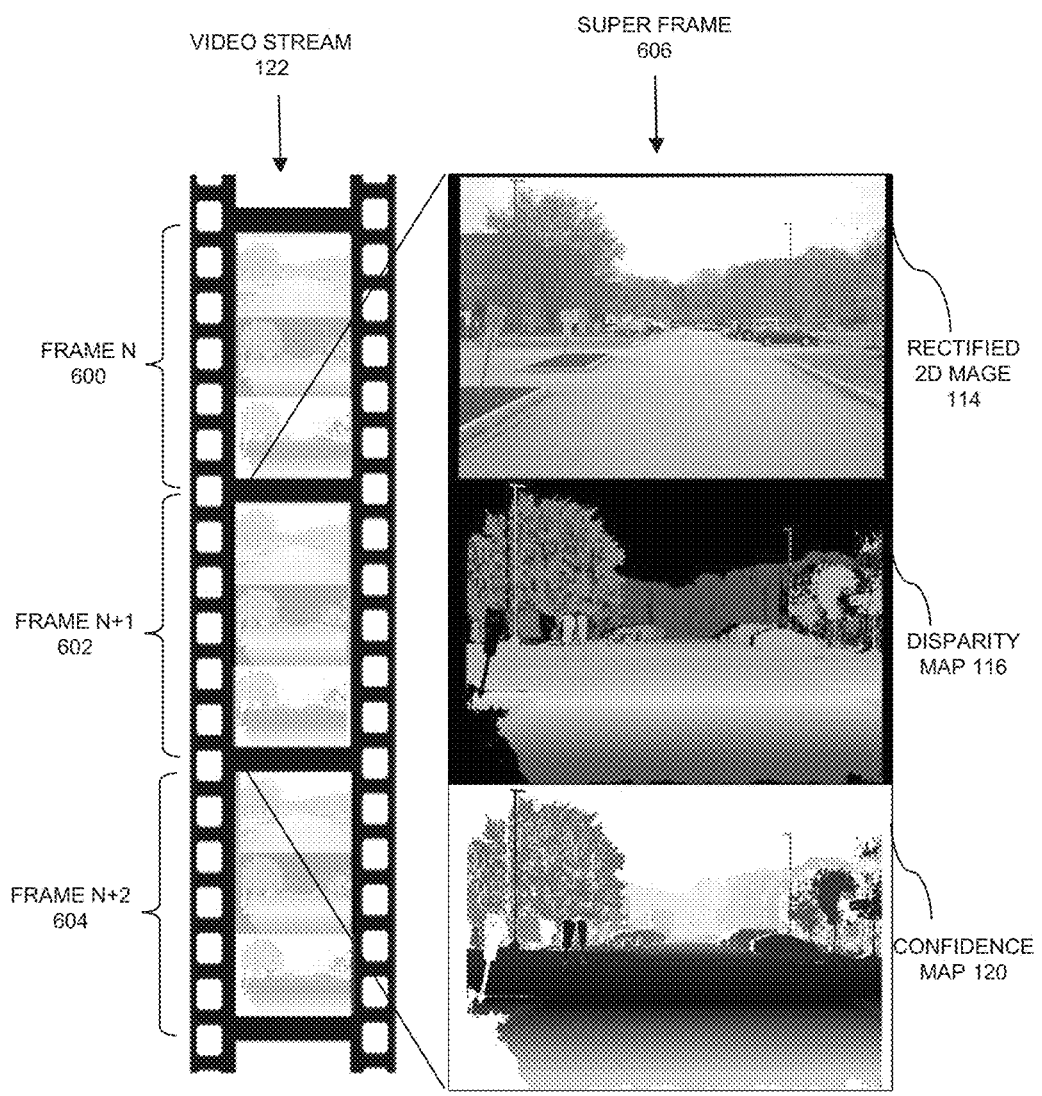
FIG. 6 shows an example of a video stream and a super-frame of the video stream, according to some embodiments of the present technology. Portions of FIG. 6 are in color.

FIG. 6 depicts an example of the video stream 122, according to some embodiments of the present technology. The video stream 122 may be comprised of a sequence frames, of which only three are shown: Frame N 600, Frame N+1 602, and Frame N+2 604. In some embodiments, each frame may be a super-frame 606 comprised of the left (or right) rectified 2D image 114 (in color or grayscale), the disparity map 116 (in color or grayscale), and the confidence map 120 (in color or grayscale). In some embodiments, the super-frame 606 also may contain one or more velocity maps, such as any one or any combination of the following: a velocity magnitude map, a horizontal velocity map (depicting motion along the x-axis), a vertical velocity map (depicting motion along the y-axis), and a line-of-sight velocity map (depicting motion along the z-axis). The velocity maps may be computed by tracking matched points (or pixels) with dense optical flow across two or more frames and then determining the difference in disparity-map values of the matched points. In this manner, the super-frames 606 may be transmitted like any other stream of video frames and therefore may advantageously use existing video technology for encoding, decoding, transmission, etc. As will be appreciated, the disparity map 116 may instead be a depth map, because both types of maps relate to distance from the sensor (e.g., the cameras 100) to the scene captured by the sensor, and both types of maps typically are inversely proportional to each other. In some embodiments, an "alpha channel" or transparency of each pixel of the rectified 2D image 114 of each super-frame may be used to store information. For example, a value for the confidence or certainty of the depth estimate for a pixel may be stored in the alpha channel of the pixel.

Figure 7A:
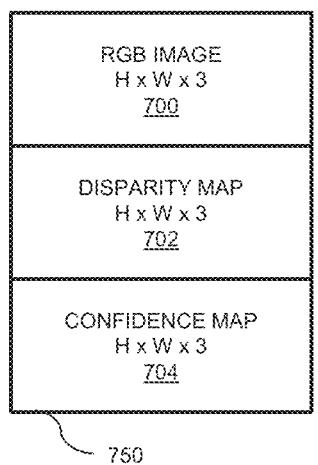
FIGS. 7A through 7F show examples of different types of super-frames that may be included in a video stream, according to some embodiments of the present technology.
Figure 7B:
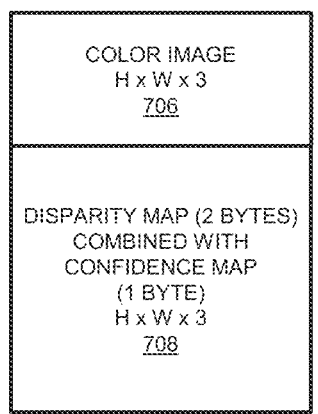
Figure 7C:
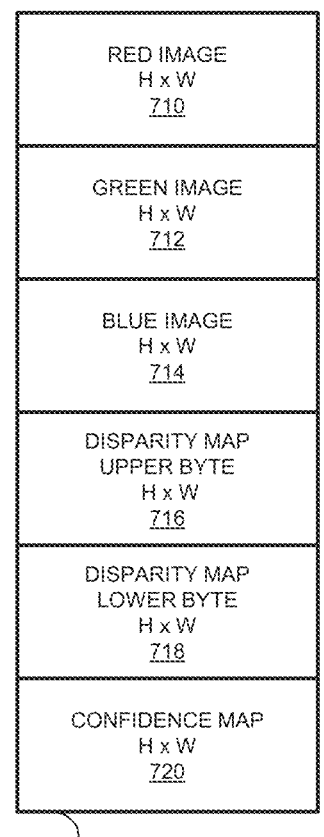
Figure 7D:
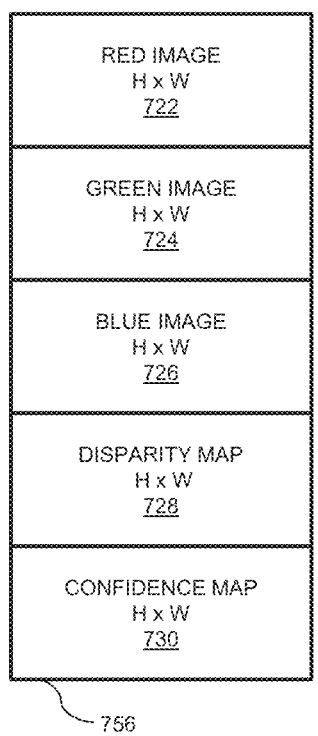
Figure 7E:
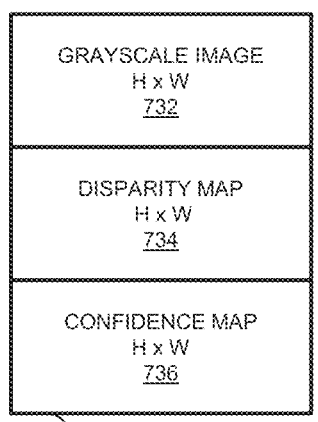
Figure 7F:
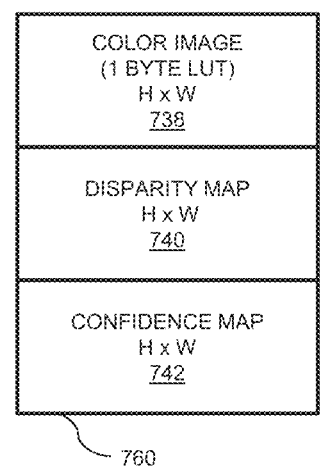

FIGS. 7A through 7F show six types of super-frames that may be included in the video stream 122, according to some embodiments of the present technology. As will be appreciated, the different types of super-frames are comprised of different types of information and therefore may have different sizes. FIG. 7A shows a super-frame 750 comprised of a 2D RGB (Red Green Blue) color image 700 (e.g., the left (or right) rectified 2D image 114), a depth map or a disparity map 700 (e.g., the disparity map 116), and a confidence map 704 (e.g., the confidence map 120) vertically concatenated. In some embodiments, each pixel of the super-frame 750 may use 3 bytes to describe the pixel's disparity or range and 3 bytes may be used to describe the pixel's confidence level. In some embodiments, each pixel of the super-frame 750 may be specified with 9 bytes. FIG. 7B shows a super-frame 752 comprised of a 2D color image 706 and a concatenation of a disparity map and a confidence map. In some embodiments, each pixel of the super-frame 752 may use 2 byes for the disparity map and 1 bye for the confidence map, for a total of 3 bytes for the concatenation. In some embodiments, each pixel of the super-frame 752 may be specified with 6 bytes. FIG. 7C shows a super-frame 754 comprised of a 2D color image formed of channels that include a channel for a red image 710, a channel for a green image 712, and a channel for a blue image 714. The super-frame 754 also is comprised a 16-bit disparity map that includes an upper byte 716 and a lower byte 718, and a confidence map. In some embodiments, each pixel of the super-frame 754 may be specified with 6 bytes. FIG. 7D shows a super-frame 756 comprised of a color image formed of a red image 722, a green image 724, and a blue image 726, a disparity map 728, and a confidence map 730. In some embodiments, each pixel of the disparity map 728 may be specified with 5 bytes. FIG. 7E shows a super-frame 758, comprised of 2D grayscale image 732, a disparity map 734, and a confidence map 736. In some embodiments, each pixel of the super-frame 758 may be specified with 3 bytes. FIG. 7F shows a super frame 760 comprised of a 2D color image 738, a disparity map 740, and a confidence map 742. Each pixel of the color image 738 may be specified with 1 byte. For example, the color image 738 may be specified by a Bayer filter pattern or a lookup table into a color palette, which may enable the super-frame 760 to be as compact in as an RGB color image. In some embodiments, each pixel of the super-frame 760 may be specified with 3 bytes.

As noted above, in addition to providing the stereo-vision confidence map 120 based on sensor data from the cameras 100 to the encoder module 112, the lidar confidence map 126, the radar confidence map 130, and the acoustic confidence map 134 may be provided to the encoder module 112. The lidar sensor, the radar sensor, and the acoustic sensor may have the same or similar fields of view as the cameras 100, as described above, or may have overlapping fields of view. In some embodiments, one or more of the lidar confidence map 126, the radar confidence map 130, and the acoustic confidence map 134 may be appended to the video stream 122. For example, the lidar confidence map 126 (or another confidence map) may be encoded as separate bits in the confidence map of any of the super-frames 750, 752, 754, 756, 758, 760 of FIGS. 7A through 7F, or may simply be appended to a super-frame by, e.g., vertical concatenation.

According to some embodiments of the present technology, a lidar confidence map (e.g., the lidar confidence map 126) may be comprised of confidence values for each pixel of a 2D image (e.g., the left (or right) rectified 2D image 114), if the lidar sensor is configured to provide a lidar return signal for each pixel of the image. In some embodiments, the lidar sensor may be configured to, e.g., provide a lidar return signal for every other pixel or every third pixel or for a predetermined group of pixels, which may result in a relatively sparser yet still useful lidar confidence map. If each pixel may be identified by its coordinates (i,j), a confidence value of the pixel (i,j) may be denoted as $m_{ij}$. In some embodiments, the lidar confidence map may be a function of the 2D image 114 and the disparity map 116 according to:

$$m_{ij} = a_0 R^{-2}(P+P_0)^{-1/2} \text{ for } R \geq R_{min}, \text{ and}$$

$$m_{ij} = 0 \text{ for } R < R_{min},$$

where R is the distance or range to an object at the pixel (i,j) as measured by the disparity map 116, P is the background light power of the pixel (i,j) (from sunlight or other sources of light) as measured by the 2D image 114, $a_0$ is a normalization constant, $P_0$ is a fitting constant, and $R_{min}$ is the minimum range of the lidar sensor. In some embodiments, the value of P may be, e.g., a grayscale value of the 2D image 114 at the pixel (i,j) divided by sensor gain and exposure values for the cameras 100. As indicated above, the 2D image and the disparity map used in producing a lidar confidence map may be the 2D image 114 is captured by the cameras 100 and the disparity map 116 determined based on stereo-vision processing. In some embodiments, when the object in the pixel (i,j) is closer than the minimum range of the lidar sensor, the confidence value for the pixel (i,j) may be set to zero. The above expression for the confidence value $m_{ij}$ is derived from an estimation of lidar signal-to-noise ratio (SNR) to be inversely proportional to a square of the distance or range, i.e., $R^2$, and also to be inversely proportional to a square root of background light power, P, or $$SNR_{lidar} \propto R^{-2} P^{-1/2}.$$

That is, the farther away an object is from the lidar sensor, the return signal decreases and hence the accuracy of a lidar estimation decreases proportionally to the number of received photons corresponding to the return signal. Additionally, any background light (e.g., solar, lunar, artificial) may cause "shot noise" to be sensed by the lidar sensor, with a noise energy equal to a square root of the background light power. Therefore, the lidar confidence map 126 may be based on two physical quantities: distance to the object in the pixel and a level of background light in the pixel.

Radar sensors and acoustic sensors, like lidar sensors, may have SNRs that are proportional to $R^{-2} P^{-1/2}$. This characteristic may be employed to compute a radar confidence map (e.g., the radar confidence map 130) and/or an acoustic confidence map (e.g., the acoustic confidence map 134) in a manner similar to that described above for computing the lidar confidence map, according to some embodiments of the present technology.

Figure 8A:
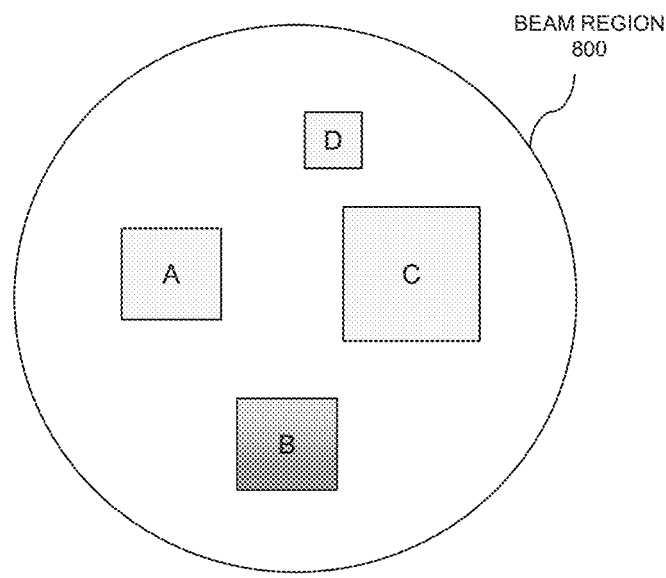
FIG. 8A schematically depicts a beam region comprising illuminating a scene captured by a sensor, according to some embodiments of the present technology.
Figure 8B:
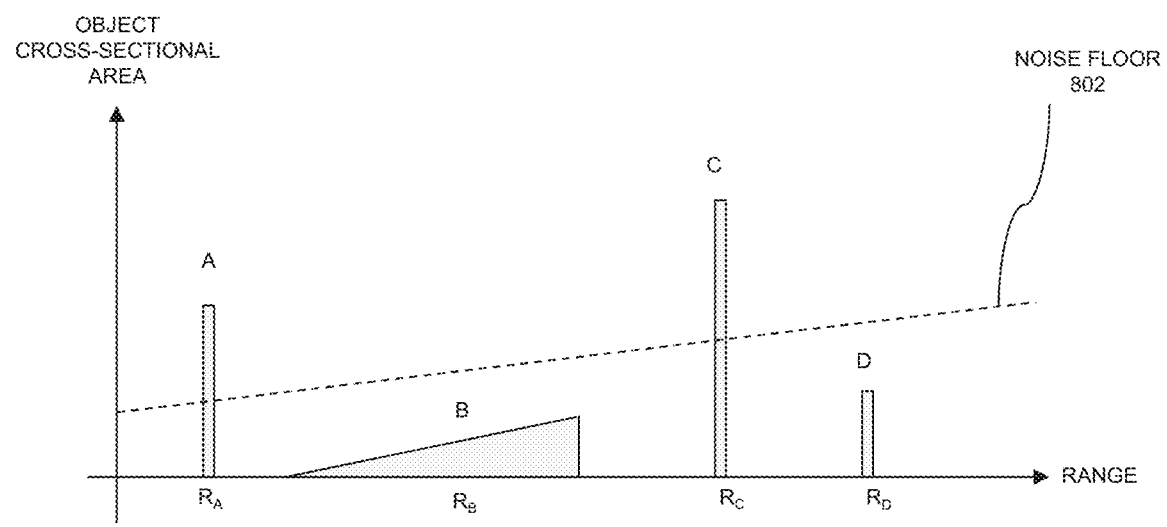
FIG. 8B is a graph depicting a relationship between cross-sectional area and range for objects in a captured image of a scene, according to some embodiments of the present technology.

According to some embodiments of the present technology, the different sensor systems on the vehicle may be arranged to sense objects at different distance ranges. For example, FIG. 8A schematically depicts a beam region 800 illuminated by a radar sensor system or an acoustic sensor system. The beam region 800 may encompass a scene with multiple objects A, B, C, D at multiple distances or ranges $R_A$, $R_B$, $R_C$, and $R_D$. The strength of a return signal reflected from an object is proportional to the object's cross-sectional area, which may be measured by the stereo vision system 1 (e.g., the range is based on the disparity map 116 and the area of the target is given by the left (or right) rectified 2D image 114). In some embodiments, return signals detected by a sensor system may be categorized in different bins based on signal strength. FIG. 8B is a graph depicting a relationship between cross-sectional area and range for each of the objects A, B, C, D. The dashed line represents a noise floor 802 of the radar sensor system (or the lidar sensor system). The noise floor 802 may correspond to sensor sensitivity, which is a known quantity for radar and lidar technologies, and which is known to degrade as a function of the square of the distance. As noted above, lidar SNR may be estimated as a value that is inversely proportional to a square of the distance or range. In some embodiments, lidar (or radar) confidence for a pixel may be determined as a value proportional to the SNR for the pixel. For example, a ratio of an object's cross-sectional area, which may span a plurality of pixels, to a range-scaled value of the noise floor 802 is a value that is proportional to the SNR and may be used as the confidence value for the pixels in which the object appears.

According to an example embodiment of the present technology, the vehicle on which the stereo vision system 1 is installed may be a passenger car. The sensors 100 may be two cameras mounted on an upper left portion and an upper right portion of the car's windshield (e.g., at the positions of the sensors S3, S7 in FIG. 2) and may be configured capture images that are processed and converted into the video stream 122, which may be comprised of super-frames such as the super-frame 750 discussed above. The RGB image 700 of the super-frame 750 may be parsed by an object detection module (e.g., a monocular object detector), which may be part of the image pre-processing module 104 or may be a separate module of the computer processor 10 that processes image data of the captured images before (or after) the images undergo rectification, before stereo matching is performed. For example, the object detection module may be configured to use a trained, convolutional neural network to determine bounding boxes of various shapes in the scene of the captured images. The shapes may correspond to categories of objects that the neural network has been trained to recognize as typical objects often encountered by a car (e.g., other vehicles, pedestrians, cyclists, traffic signs, traffic lights etc.). The disparity map 702 of the super-frame 750 may be averaged over the bounding boxes to determine an average distance to the detected objects. Furthermore, a ground plane or road surface may be computed from the disparity map 702 using known techniques, such as techniques using vertical disparity histograms described in "Road Surface Segmentation based on Vertically Local Disparity Histogram for Stereo Camera" by S. Kakegawa et al. (Int'l J. ITS Res. vol. 16, pp. 90-97, 2018), and techniques using stochastic occupancy grids and dynamic programming described in "Free Space Computation Using Stochastic Occupancy Grids and Dynamic Programming" by H. Badino et al. (Workshop on Dynamical Vision, ICCV, 2007). From the road surface, unclassified road hazards (e.g., motorcycle helmets, bricks, wooden pallets, from loose loads, mufflers, tread that has separated from tires, etc.) may be located and marked. Small unclassified objects on typical road surfaces often have well-defined edges and contour features, which may lead to high confidence values in the confidence map 704 and therefore may prevent false positives and unnecessary automated emergency braking from occurring. In this example embodiment, when there is debris on the windshield (e.g., mud) that blocks the lower left part of the captured image of one or both of the cameras 100, the confidence processing module 110 may detect that the stereo matching module 108 repeatedly reports a high cost in the lower left part of the cost volume map 118 output by the stereo matching module 108 and may therefore provide low confidence values for a corresponding region of the confidence map 120. The main system controller 30 of the car may be configured to determine whether the low confidence values are within an acceptable confidence threshold and, if not, may control the computer processor 10 to invalidate data from the lower left region. That is, in some embodiments, because the confidence values for the lower left region are below a reliability threshold and therefore computed depth values for the lower left region may be invalid, the computer processor 10 may be controlled not to use data from the cameras 100 pertaining to the lower left region to detect objects in the scene of the captured image, to avoid false readings and consequently to avoid erroneous control of the car (e.g., to prevent the car from being controlled to perform an evasive maneuver to avoid an object that is not actually in the scene). Instead, as discussed above, data from other sensors on the car may be used, if confidence values for the data meet the confidence threshold.

Returning to FIG. 3, the main system controller 30 may be configured to issue control signals to a plurality of ECUs 34-1, 34-2, 34-3, 34-4, . . . , 34-n configured to control various aspects of operation of the vehicle, according to some embodiments of the present technology. For example, the video stream 122 may be provided to a display of the vehicle (not shown) and also to the main system controller 30, which may use disparity information and confidence information from the video stream 122 to determine with high certainty (e.g., greater than 90% certainty) that a red tails lights are ahead in the vehicle's path, which may indicate a traffic jam or other potential hazard. The main system controller 30 may then issue a control signal to the ECU 34-1, which may control the vehicle's power train, to cause the vehicle to slow down and come to a halt. In some embodiments, processing by the computer processor 10 and/or the main system controller 30 may be sufficiently fast that the display may show video corresponding to the video stream 122 in real time or nearly real time (e.g., is less than 2 seconds or less than 1 second) to when the image data of the scene is captured by the cameras 100 and transferred to the image acquisition module 102. In some embodiments, the ECU 34-1 may receive the control signal in real time or nearly real time to when the image data of the scene is captured by the cameras 100 and transferred to the image acquisition module 102. As noted above, communication between the main system controller 30 and the ECUs 34-1, 34-2, 34-3, 34-4, . . . , 34-n may be via techniques. For example, the command and control line 32 may be a network or bus onboard the vehicle and may use a known protocol (e.g., Ethernet, CAN, I2C, LIN, etc.) to send signals between the main system controller 30 and the ECUs 34-1, 34-2, 34-3, 34-4, . . . , 34-n.

Figure 9A:
FIGS. 9A and 9B show examples of a disparity map and a confidence map, respectively, according to some embodiments of the present technology. Portions of FIG. 9A are in color.
Figure 9B:
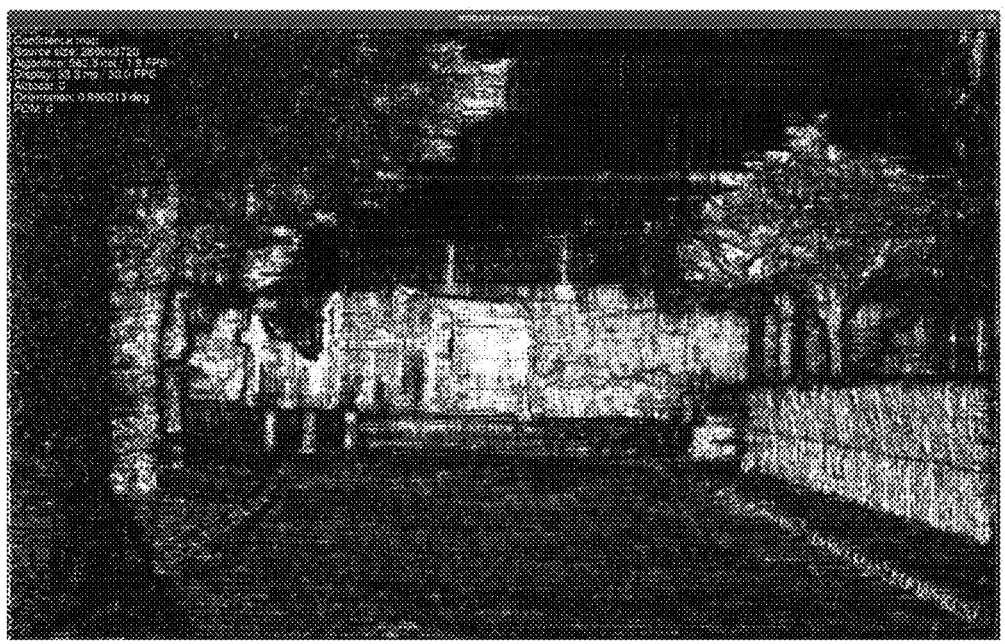

FIGS. 9A and 9B show examples of data resulting from images of a scene captured by two 5-megapixel cameras and processed according to various embodiments of the present technology described above. The two cameras were mounted to the roof of a standard passenger vehicle such that they are separated by a 1.2-m baseline. FIG. 9A shows a color disparity map that has been blended with a grayscale camera image (not shown) so that both the distance and the luminosity of the scene may be viewed simultaneously. The disparity map has values from 0 to 1023 that are encoded with a jet colormap, where red colors indicate relatively close objects and blue colors indicate objects relatively farther away. The transparency of the disparity map is modulated by the grayscale camera image. FIG. 9B shows a corresponding confidence map of the scene. The confidence map shows the minimum aggregated cost values for each pixel from a semi-global matching algorithm, such as described in "Stereo Processing by Semi-Global Matching and Mutual Information" by H. Hirschmuller (2008 IEEE Transactions on Pattern Analysis and Machine Intelligence).

According to some embodiments of the present technology, the processing modules and components in FIGS. 1, 3, and 5 may be implemented in hardware (e.g., one or more computer processor(s) programmed to perform the procedures and methods described above) and/or in software (e.g., computer-executable code). In some embodiments, at least some of the software may be preprogrammed in the computer processor(s). In some embodiments, at least some of the software may be stored on a non-transitory computer-readable storage medium or on a plurality of non-transitory computer-readable storage media, and which may be accessed and executed by the computer processor(s). In some embodiments, a process module may be a software module or a hardware module or a module that combines hardware and software.

Vehicle assistance systems according to the technology described herein may be embodied in different configurations. Example configurations include combinations of configurations (1) through (21), as follows:

(1) An automated vehicle assistance system for supervised or unsupervised vehicle movement, the system comprising: a vehicle control system comprised of a computer processor and a memory coupled to the computer processor; and a first sensor system configured to receive first image data of a scene and to output a first disparity map and a first confidence map based on the first image data, wherein the vehicle control system is configured to: receive the first disparity map and the first confidence map from the first sensor system, and output a video stream comprised of the first disparity map and the first confidence map.

(2) The system of configuration (1), wherein, in the video stream, the first confidence map is encoded to be part of the first disparity map.

(3) The system of configuration (1) or configuration (2), wherein the first image data is comprised of a plurality of pixels, the disparity map is comprised of disparity data for each of the pixels, and the confidence map is comprised of confidence data for each of the pixels.

(4) The system of any one of configurations (1) through (3), the first image data is comprised of data for left and right two-dimensional (2D) first images, the first sensor system is configured to produce left and right (2D) rectified first images and a first cost volume map from the first image data, and the first sensor system is configured to produce the first confidence map from: the 2D rectified first images, the first disparity map, and the first cost volume map.

(5) The system of any one of configurations (1) through (4), wherein the first sensor system is configured to produce the first confidence map based on one or both of: a uniqueness value determined from a semi-global matching (SGM) algorithm and an image texture value determined from a Sobel operation on the first image data.

(6) The system of any one of configurations (1) through (5), further comprising: a second sensor system configured to receive second image data of at least a portion of the scene and to output a second confidence map based on the second image data, wherein the vehicle control system is configured to: receive the second confidence map from the second sensor system and output the video stream as a sequence of super-frames, with each super-frame being comprised of information based on: the first disparity map, the first confidence map, and the second confidence map.

(7) The system of any one of configurations (1) through (6), wherein the vehicle control system is configured to output a control signal to an electronic control unit (ECU) of a vehicle based on the information of the video stream.

(8) The system of any one of configurations (1) through (7), wherein: the first sensor system is a first sensor module configured to process the first image data to produce the first disparity map and the first confidence map, the second sensor system is a second sensor module configured to process the second image data to produce the second confidence map, the first and second sensor modules are stored in the memory, and the computer processor is configured to execute the first sensor module and the second sensor module.

(9) The system of any one of configurations (1) through (8), wherein the video stream is comprised of: at least one super-frame comprised of the first disparity map and the first confidence map, and at least one super-frame comprised of the first disparity map and the second confidence map.

(10) The system of any one of configurations (1) through (9), wherein the video stream is comprised of at least one super-frame comprised of a portion of the first confidence map and a portion of the second confidence map.

(11) The system of any one of configurations (1) through (10), wherein: the first image data is comprised of stereo-vision data, and the second image data is comprised of lidar data.

(12) The system of any one of configurations (1) through (11), further comprising: a third sensor system configured to receive third image data of at least a portion of the scene and to output a third confidence map based on the third image data.

(13) The system of any one of configurations (1) through (12), wherein the third image data is comprised of radar data or acoustic data.

(14) The system of any one of configurations (1) through (13), wherein each super-frame of the video stream is comprised of: a two-dimensional (2D) image of the scene, a depth map of the scene, and a certainty map of the scene.

(15) The system of any one of configurations (1) through (14), wherein the certainty map of the scene is comprised of the first confidence map or the second confidence map or a combination of the first and second confidence maps.

(16) The system of any one of configurations (1) through (15) wherein: the depth map of the scene is comprised of the first disparity map modulated with image data corresponding to the 2D image of the scene, and the certainty map of the scene is comprised of the comprised of the first confidence map or the second confidence map or a combination of the first and second confidence maps modulated with image data corresponding to the 2D image of the scene.

(17) The system of any one of configurations (1) through (16), wherein pixels of the 2D image of the scene, pixels of the depth map of the scene, and pixels of the certainty map of the scene are temporally and spatially matched.

(18) The system of any one of configurations (1) through (17), wherein the vehicle control system is configured to encode disparity information from the first disparity map and confidence information from the first and second confidence maps to reduce a data size of the video stream.

(19) The system of any one of configurations (1) through (18), further comprising: a pair of cameras configured to be mounted on a vehicle, wherein the cameras are configured to provide the first image data to the first sensor system.

(20) The system of any one of configurations (1) through (19), wherein the video stream is comprised of two-dimensional (2D) color images, with each 2D color image being comprised of a plurality of pixels, and with an alpha-channel transparency of each pixel being proportional to a confidence value for the pixel.

(21) The system of any one of configurations (1) through (20), wherein colors of the 2D color images indicate depth ranges.

Non-transitory computer-readable storage media may be configured to store code that, when executed by a computer processor, causes the computer processor to perform methods of an automated vehicle assistance system for supervised or unsupervised vehicle movement according to the technology described herein. Examples of such computer-readable storage media include combinations of configurations (22) through (34), as follows:

(22) A non-transitory computer-readable storage medium storing code that, when executed by a computer processor, causes the computer processor to perform a method of an automated vehicle assistance system for supervised or unsupervised vehicle movement, wherein the method is comprised of: the computer processor obtaining a first disparity map and a first confidence map, the first disparity map and the first confidence map corresponding to first image data of a scene, and the computer processor outputting a video stream comprised of the first disparity map and the first confidence map.

(23) The computer-readable storage medium of configuration (22), wherein the outputting of the video stream is comprised of the computer processor encoding the first confidence map to be part of the first disparity map.

(24) The computer-readable storage medium of configuration (22) or configuration (23), wherein: the first image data is comprised of a plurality of pixels, the disparity map is comprised of disparity data for each of the pixels, and the confidence map is comprised of confidence data for each of the pixels.

(25) The computer-readable storage medium of any one of configurations (22) through (24), wherein the method is further comprised of: the computer processor obtaining a second confidence map corresponding to second image data of at least a portion of the scene, and the computer processor outputting the video stream as a sequence of super-frames, with each super-frame being comprised of information based on: the first disparity map, the first confidence map, and the second confidence map.

(26) The computer-readable storage medium of any one of configurations (22) through (25), wherein the method is further comprised of: the computer processor outputting a control signal to an electronic control unit (ECU) of a vehicle based on the information of the video stream.

(27) The computer-readable storage medium of any one of configurations (22) through (26), wherein the method is further comprised of: the computer processor processing the first image data to obtain the first disparity map and the first confidence map, and the computer processor processing the second image data to obtain the second confidence map.

(28) The computer-readable storage medium of any one of configurations (22) through (27), the outputting of the video stream is comprised of: the computer processor preparing at least one super-frame to be comprised of the first disparity map and the first confidence map, and the computer processor preparing at least one super-frame to be comprised of the first disparity map and the second confidence map.

(29) The computer-readable storage medium of any one of configurations (22) through (28), wherein the outputting of the video stream is comprised of the computer processor preparing at least one super-frame comprised of a portion of the first confidence map and a portion of the second confidence map.

(30) The computer-readable storage medium of any one of configurations (22) through (29), wherein: the first image data is comprised of stereo-vision data, and the second image data is comprised of lidar data or radar data or acoustic data.

(31) The computer-readable storage medium of any one of configurations (22) through (30), wherein the outputting of the video stream is comprised of the computer processor preparing each super-frame of the video stream to be comprised of: a two-dimensional (2D) image of the scene, a depth map of the scene, and a certainty map of the scene.

(32) The computer-readable storage medium of any one of configurations (22) through (31), wherein the preparing of each super-frame by the computer processor is comprised of temporally and spatially matching pixels of the 2D image of the scene, pixels of the depth map of the scene, and pixels of the certainty map of the scene.

(33) The computer-readable storage medium of any one of configurations (22) through (32), wherein the outputting of the video stream is comprised of the computer processor encoding encode disparity information from the first disparity map and confidence information from the first and second confidence maps to reduce a data size of the video stream.

(34) The computer-readable storage medium of any one of configurations (22) through (33), wherein the outputting of the video stream is comprised preparing two-dimensional (2D) color images such that: each 2D color image is comprised of a plurality of pixels, an alpha-channel transparency of each pixel is proportional to a confidence value for the pixel, and colors of the 2D color images indicate depth ranges.

Stereo vision systems according to the technology described herein may be embodied in different configurations. Example configurations include combinations of configurations (35) through (46), as follows:

(35) A stereo vision system, comprising: a stereo camera system configured to capture of a sequence of pairs of images, each pair of images being comprised of first image and a second image captured simultaneously; and a computer processor programmed to: receive a stream of image data from the stereo camera system, the image data corresponding to the sequence of pairs of images, for each of the pairs of images: rectify the first and second images to produce a two-dimensional (2D) pixel map of matched pixels, determine a depth value for each pixel of the pixel map, and determine a confidence value for the depth value for each pixel of the pixel map, and issue a control signal when at least one of the confidence values indicates an image abnormality.

(36) The system of configuration (35), wherein the image abnormality corresponds to one or more pixels of a portion of the confidence map having a confidence value below a predetermined threshold value.

(37) The system of configuration (35) or configuration (36), wherein the image abnormality corresponds to one or more pixels of a portion of the confidence map having a confidence value below a predetermined threshold value for two or more consecutive pairs of images of the sequence.

(38) The system of any one configurations (35) through (37), wherein the image abnormality is comprised of a plurality of pixels of a contiguous region of the confidence map.

(39) The system of any one configurations (35) through (38), wherein the control signal is configured to cause an audible sound.

(40) The system of any one configurations (35) through (39), wherein the audible sound is a pre-recorded message.

(41) The system of any one configurations (35) through (40), wherein the control signal is issued to an engine control module of a vehicle.

(42) The system of any one configurations (35) through (41), wherein, for each pixel of the pixel map, the confidence value is determined based on a presence or absence of an edge in the pixel, an illumination level of the pixel, and a texture value of the first and second images from which the pixel map is produced.

(43) The system of any one configurations (35) through (42), wherein the computer processor is programmed to output a sequence of super-frames corresponding to the sequence of pairs of images, each of the super-frames being comprised of a 2D image and a confidence map corresponding to the 2D image.

(44) The system of any one configurations (35) through (43), wherein the 2D image is the first image or the second image.

(45) The system of any one configurations (35) through (44), wherein the computer processor is programmed to output the sequence of super-frames as a display signal that causes a display to show the 2D image and a visible confidence indicator corresponding to the confidence map.

(46) The system of any one configurations (35) through (45), wherein the display signal causes the confidence indicator to be displayed on a pixel-by-pixel basis as a transparency of each pixel of the 2D image.

Non-transitory computer-readable storage media may be configured to store code that, when executed by a computer processor, causes the computer processor to perform methods of a vehicle assistance system according to the technology described herein. Examples of such computer-readable storage media include combinations of configurations (47) through (59), as follows:

(47) A non-transitory computer-readable storage medium storing code that, when executed by a computer processor, causes the computer processor to perform a method of a stereo vision system, wherein the method is comprised of: the computer processor receiving a stream of image data from a stereo camera system, the image data corresponding to the sequence of pairs of images, each pair of images being comprised of first image and a second image captured simultaneously; and for each of the pairs of images, the computer processor: rectifying the first and second images to produce a two-dimensional (2D) pixel map of matched pixels, determining a depth value for each pixel of the pixel map, and determining a confidence value for the depth value for each pixel of the pixel map; and the computer processor issuing a control signal when at least one of the confidence maps indicates an image abnormality.

(48) The computer-readable storage medium of configuration (47), wherein the image abnormality corresponds to one or more pixels of a portion of the confidence map having a confidence value below a predetermined threshold value.

(49) The computer-readable storage medium of configuration (47) or configuration (48), wherein the image abnormality corresponds to one or more pixels of a portion of the confidence map having a confidence value below a predetermined threshold value for two or more consecutive pairs of images of the sequence.

(50) The computer-readable storage medium of any one of configurations (47) through (49), wherein the image abnormality is comprised of a plurality of pixels of a contiguous region of the confidence map.

(51) The computer-readable storage medium of any one of configurations (47) through (50), wherein the control signal is configured to cause an audible sound.

(52) The computer-readable storage medium of any one of configurations (47) through (51), wherein the audible sound is a pre-recorded message.

(53) The computer-readable storage medium of any one of configurations (47) through (52), wherein the control signal is issued to an engine control module of a vehicle.

(54) The computer-readable storage medium of any one of configurations (47) through (53), wherein, for each pixel of the pixel map, the confidence value is determined based on a presence or absence of an edge in the pixel, an illumination level of the pixel, and a texture value of the first and second images from which the pixel map is produced.

(55) The computer-readable storage medium of any one of configurations (47) through (54), wherein the method is further comprised of: the computer processor outputting a sequence of super-frames corresponding to the sequence of pairs of images, each of the super-frames being comprised of a 2D image, a disparity map corresponding to the 2D image, and a confidence map corresponding to the 2D image.

(56) The computer-readable storage medium of any one of configurations (47) through (55), wherein the 2D image is the first image or the second image.

(57) The computer-readable storage medium of any one of configurations (47) through (56), wherein the outputting of the sequence of super-frames is comprised of outputting a display signal that causes a display to show the 2D image and a visible confidence indicator corresponding to the confidence map.

(58) The computer-readable storage medium of any one of configurations (47) through (57), wherein the display signal causes the confidence indicator to be displayed on a pixel-by-pixel basis as a transparency of each pixel of the 2D image.

(59) The computer-readable storage medium of any one of configurations (47) through (58), wherein each of the super-frames is comprised of the 2D image, the confidence map, and a disparity map corresponding to the 2D image.

REFERENCES CITED

Mohd Saad Hamid, Nurul Fajar Abd Manap, Rostam Affendi Hamzah, and Ahmad Fauzan Kadmin, "Stereo matching algorithm based on deep learning: A survey," Journal of King Saud University—Computer and Information Sciences, 2020, (available at: https://doi.org/10.1016/j.jksuci.2020.08.011).

H. Hirschmuller, "Stereo Processing by Semiglobal Matching and Mutual Information," IEEE Transactions on Pattern Analysis and Machine Intelligence, vol. 30, no. 2, pp. 328-341, February 2008 (available at https://core.ac.uk/download/pdf/11134866.pdf).

Matteo Poggi, Seungryong Kim, Fabio Tosi, Sunok Kim, Filippo Aleotti, Dongbo Min, Kwanghoon Sohn, Stefano Mattoccia, "On the confidence of stereo matching in a deep-learning era: a quantitative evaluation," IEEE Trans Pattern Analysis & Machine Intelligence, April 2021 (available at https://arxiv.org/pdf/2101.00431.pdf).

H. Hirschmuller and D. Scharstein, "Evaluation of Cost Functions for Stereo Matching," IEEE Conference on Computer Vision and Pattern Recognition, 2007, pp. 1-8.

S. Sarika et al., "Census Filtering Based Stereomatching Under Varying Radiometric Conditions," Procedia Computer Science, vol. 58, pp. 315-320, 2015.

C. Rhemann, A. Hosni, M. Bleyer, C. Rother, and M. Gelautz, "Fast cost-volume filtering for visual correspondence and beyond," Conference on Computer Vision and Pattern Recognition 2011, pp. 3017-3024.

X. Hu and P. Mordohai, "A Quantitative Evaluation of Confidence Measures for Stereo Vision," in IEEE Transactions on Pattern Analysis and Machine Intelligence, vol. 34, no. 11, pp. 2121-2133, 2012.

S. Kakegawa, H. Matono, H. Kido, and T. Shima, "Road Surface Segmentation based on Vertically Local Disparity Histogram for Stereo Camera," International Journal of Intelligent Transportation Systems Research, vol. 16, pp. 90-97, 2018 (available at https://doi.org/10.1007/s13177-017-0140-8 and https://link.springer.com/content/pdf/10.1007/s13177-017-0140-8.pdf).

H. Badino, U. Franke, R. Mester, "Free Space Computation Using Stochastic Occupancy Grids and Dynamic Programming," Workshop on Dynamical Vision, 11$^{th}$ IEEE International Conference on Computer Vision, ICCV, 2007, (available at http://vision.jhu.edu/iccv2007-wdv/WDV07-badino.pdf).

CONCLUSION

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. A vision system for supervised or unsupervised movement of a vehicle, the system comprising:
a pair of camera sensors configured to capture first image data of a scene;
an auxiliary sensor configured to capture second image data of the scene; and
a sensor system configured to:
receive the first image data from the pair camera sensors,
receive the second image data from the auxiliary sensor,
calculate first distance values and first confidence values from the first image data,
generate a first distance map comprising the first distance values, and generate a first confidence map comprising the first confidence values,
generate a second distance map comprising second distance values obtained from the second image data,
fuse the first distance map with the second distance map, using the first confidence map, to obtain a fused distance map, and
output a first control signal to an electronic control unit (ECU) of the vehicle to control the vehicle based on the fused distance map.

2. The vision system of claim 1, wherein the sensor system is configured to fuse the first distance map with the second distance map to obtain a fused distance map at least in part by:
determining whether a low-confidence portion is included in the first confidence map, the low-confidence portion including at least one confidence value below a predetermined threshold, and
if the first confidence map is determined to include the low-confidence portion, generating the fused map by replacing a portion of the first distance map corresponding to the low-confidence portion with a replacement portion obtained from the second distance map.

3. The vision system of claim 1, wherein the first control signal is output in real time or nearly real time to when the scene is captured by the pair of camera sensors and the auxiliary sensor.

4. The vision system of claim 1, wherein the auxiliary sensor comprises any one or any combination of:
a radar sensor,
a lidar sensor,
an auxiliary camera sensor, and
an acoustic sensor.

5. The vision system of claim 1, wherein the sensor system is configured to determine a confidence value for each pixel of the first image data.

6. The vision system of claim 1, wherein the sensor system is configured to determine a confidence value for each region of a plurality of regions of the first image data.

7. The visional system of claim 1, wherein the fused distance map includes an entirety of the second distance map.

8. A method of a vision system for supervised or unsupervised movement of a vehicle, the method comprising:
receiving, from a pair of camera sensors on the vehicle, first image data captured of a scene;
receiving, from an auxiliary sensor on the vehicle, second image data captured of the scene;
calculating first distance values and first confidence values from the first image data;
generating a first distance map comprising the first distance values, and generating a first confidence map comprising the first confidence values;
generating a second distance map comprising second distance values obtained from the second image data;
fusing the first distance map with the second distance map, using the first confidence map, to obtain a fused distance map; and outputting a first control signal to an electronic control unit (ECU) of the vehicle to control the vehicle based on the fused distance map.

9. The method of claim 8, wherein the fusing of the first distance map with the second distance map to obtain the fused distance map comprises:
   determining whether a low-confidence portion is included in the first confidence map, the low-confidence portion including at least one confidence value below a predetermined threshold, and
   if the first confidence map is determined to include the low-confidence portion, generating the fused distance map by replacing a portion of the first distance map corresponding to the low-confidence portion with a replacement portion obtained from the second distance map.

10. The method of claim 8, wherein the first control signal is output to the vehicle control system in real time or nearly real time to when the scene is captured by the pair of camera sensors and the auxiliary sensor.

11. The method of claim 8, wherein the auxiliary sensor comprises any one or any combination of:
   a radar sensor,
   a lidar sensor,
   an auxiliary camera sensor, and
   an acoustic sensor.

12. The method of claim 8, wherein the calculating includes determining a confidence value for each pixel of the first image data.

13. The method of claim 8, wherein the calculating includes determining a confidence value for each region of a plurality of regions of the first image data.

14. The method of claim 8, wherein the fused distance map includes an entirety of the second distance map.

15. A non-transitory computer-readable storage medium storing code that, when executed by a computer processor, causes the computer processor to perform a method of a vision system for supervised or unsupervised movement of a vehicle, wherein the method comprises:
   calculating first distance values and first confidence values from first image data of a scene captured by a pair of camera sensors on the vehicle;
   generating a first distance map comprising the first distance values, and generating a first confidence map comprising the first confidence values;
   generating a second distance map comprising second distance values obtained from second image data captured of the scene by an auxiliary sensor on the vehicle;
   fusing the first distance map with the second distance map, using the first confidence map, to obtain a fused distance map; and
   outputting a first control signal to an electronic control unit (ECU) of the vehicle to control the vehicle based on the fused distance map.

16. The computer-readable storage medium of claim 15, wherein the fusing of the first distance map with the second distance map to obtain the fused distance map comprises:
   determining whether a low-confidence portion is included in the first confidence map, the low-confidence portion including at least one confidence value below a predetermined threshold, and
   if the first confidence map is determined to include the low-confidence portion, generating the fused distance map by replacing a portion of the first distance map corresponding to the low-confidence portion with a replacement portion obtained from the second distance map.

17. The computer-readable storage medium of claim 15, wherein the first control signal is output in real time or nearly real time to when the scene is captured by the pair of camera sensors and the auxiliary sensor.

18. The computer-readable storage medium of claim 15, wherein the auxiliary sensor comprises any one or any combination of:
   a radar sensor,
   a lidar sensor,
   an auxiliary camera sensor, and
   an acoustic sensor.

19. The computer-readable storage medium of claim 15, wherein the calculating includes determining a confidence value for each pixel of the first image data.

20. The computer-readable storage medium of claim 15, wherein the calculating includes determining a confidence value for each region of a plurality of regions of the first image data.

21. A vision system for supervised or unsupervised movement of a vehicle, the system comprising:
   a pair of camera sensors configured to capture first image data of a scene;
   an auxiliary sensor configured to capture second image data of the scene; and
   a sensor system configured to:
      receive the first image data from the pair camera sensors,
      receive the second image data from the auxiliary sensor,
      calculate first distance values and first confidence values from the first image data,
      generate a first distance map comprising the first distance values, and generate a first confidence map comprising the first confidence values,
      generate a second distance map comprising second distance values obtained from the second image data, and
      output a first control signal to an electronic control unit (ECU) of the vehicle to control the vehicle based on the first confidence values, the first distance values, and the second distance values.

* * * * *